(12) United States Patent  
Keustermans et al.

(10) Patent No.: US 11,443,494 B2  
(45) Date of Patent: Sep. 13, 2022

(54) METHOD FOR ESTIMATING AT LEAST ONE OF SHAPE, POSITION AND ORIENTATION OF A DENTAL RESTORATION

(71) Applicant: Nobel Biocare Services AG, Kloten (CH)

(72) Inventors: Johannes Keustermans, Broechem (BE); Pieter Van Leemput, Rumst (BE); Veerle Wouters, Kessel-Lo (BE); Wouter Mollemans, Antwerp (BE)

(73) Assignee: Nobel Biocare Services AG, Kloten (CH)

( * ) Notice: Subject to any disclaimer, the term of this patent is extended or adjusted under 35 U.S.C. 154(b) by 939 days.

(21) Appl. No.: 16/223,604

(22) Filed: Dec. 18, 2018

(65) Prior Publication Data

US 2019/0147666 A1 May 16, 2019

Related U.S. Application Data

(63) Continuation-in-part of application No. PCT/EP2017/065147, filed on Jun. 20, 2017.

(30) Foreign Application Priority Data

Jun. 21, 2016 (EP) .................................. 16175446

(51) Int. Cl.
*G06T 19/20* (2011.01)
*G06F 30/20* (2020.01)
(Continued)

(52) U.S. Cl.
CPC ............. *G06T 19/20* (2013.01); *A61C 7/002* (2013.01); *A61C 8/0001* (2013.01);
(Continued)

(58) Field of Classification Search
CPC ..... G06T 19/20; G06T 17/20; G06T 2210/41; G06T 2219/2004; G06T 2219/2016;
(Continued)

(56) References Cited

U.S. PATENT DOCUMENTS 9,414,897 B2 * 8/2016 Wu .......................... G06F 30/00
2002/0055800 A1 5/2002 Nikolskiy et al.
(Continued)

FOREIGN PATENT DOCUMENTS

CN 101530349 9/2009
CN 101534741 9/2009
(Continued)

OTHER PUBLICATIONS

J. Sporring, K. H. Jensen, "Bayes Reconstruction of Missing Teeth", pp. 245-254, (Year: 2008).*
(Continued)

*Primary Examiner* — Kibrom K Gebresilassie
(74) *Attorney, Agent, or Firm* — Knobbe, Martens, Olson & Bear, LLP

(57) ABSTRACT

A method is provided for obtaining an estimation of the shape, position and/or orientation of one or more existing teeth of a patient or of one or more teeth to be included in a dental restoration destined to replace one or more missing teeth in a partially edentulous patient. The method involves adapting a virtual teeth setup to the intra-oral anatomical situation of the patient, wherein said virtual teeth setup includes separated surface meshes of individual teeth positioned in a dental arch or segment thereof. The virtual teeth setup is adapted by optimizing an energy function, which represents a quality measure for said virtual teeth setup, and using a statistical model, which describes for a given dentition or segment thereof a probability distribution for at least the shapes of individual teeth, the relations between (Continued)

shapes of neighbouring teeth and/or relations between positions and/or orientations of neighbouring teeth. The adapted virtual teeth setup resulting from said optimized energy function is subsequently used to estimate said sought for shape, position and/or orientation.

35 Claims, 9 Drawing Sheets

(51) Int. Cl.
  *A61C 13/00* (2006.01)
  *G06F 30/17* (2020.01)
  *A61C 7/00* (2006.01)
  *A61C 8/00* (2006.01)
  *A61C 9/00* (2006.01)
  *G06T 17/20* (2006.01)

(52) U.S. Cl.
  CPC ............ *A61C 8/0096* (2013.01); *A61C 9/004* (2013.01); *A61C 13/0004* (2013.01); *G06F 30/17* (2020.01); *G06F 30/20* (2020.01); *G06T 17/20* (2013.01); *G06T 2210/41* (2013.01); *G06T 2219/2004* (2013.01); *G06T 2219/2016* (2013.01); *G06T 2219/2021* (2013.01)

(58) Field of Classification Search
  CPC . G06T 2219/2021; G06F 30/20; G06F 30/17; A61C 7/002; A61C 8/0001; A61C 8/0096; A61C 9/004
  See application file for complete search history.

(56) References Cited

U.S. PATENT DOCUMENTS

| | | | | |
|---|---|---|---|---|
| 2009/0246726 | A1* | 10/2009 | Chelnokov | ............ A61C 7/002 433/24 |
| 2011/0183295 | A1 | 7/2011 | Boronvinskih et al. | |
| 2012/0179281 | A1* | 7/2012 | Steingart | ................ A61C 13/10 703/11 |
| 2012/0203513 | A1 | 8/2012 | Chelnokov et al. | |
| 2012/0282567 | A1* | 11/2012 | Nilsson | .............. A61C 13/0004 433/68 |
| 2012/0284000 | A1* | 11/2012 | Nilsson | .................. A61C 13/08 703/11 |
| 2013/0317800 | A1* | 11/2013 | Wu | ......................... G06T 19/20 703/11 |
| 2015/0173870 | A1* | 6/2015 | Suttin | .................... A61C 13/08 433/202.1 |
| 2019/0147666 | A1* | 5/2019 | Keustermans | ..... A61C 13/0004 433/213 |

FOREIGN PATENT DOCUMENTS

| | | |
|---|---|---|
| CN | 102147935 | 8/2011 |
| CN | 103648396 | 3/2014 |
| CN | 104114125 | 10/2014 |
| CN | 104125814 | 10/2014 |
| CN | 104699865 | 6/2015 |
| CN | 105488849 | 4/2016 |
| EP | 1191897 | 3/2009 |
| JP | 2005199084 | 7/2005 |
| WO | WO 0191031 | 11/2001 |
| WO | WO 2004044787 | 5/2004 |
| WO | WO 2013034462 A2 | 3/2013 |

OTHER PUBLICATIONS

International Search Report and Written Opinion received in PCT Application No. PCT/EP2017/065147, dated Sep. 15, 2017.
Buchaillard et al: "3D statistical models for tooth surface reconstruction", Computers in Biology and Medicine, New York, NY, US, vol. 37, No. 10, Aug. 8, 2007 (Aug. 8, 2007), pp. 1461-1471.
Sporring et al: "Bayes Reconstruction of Missing Teeth", Journal of Mathematical Imaging and Vision, Kluwer Academic Publishers, BO, vol. 31, No. 2-3, May 8, 2008, pp. 245-254.

* cited by examiner

```
┌─────────────────────────────────────┐
│ Indicating a tooth or teeth for which │
│ estimation of shape/position/orientation is │
│ needed                              │
└─────────────────────────────────────┘
```

```
┌─────────────────────────────────────┐
│ Applying and optimizing an energy function │
│ using                               │
│    - a first measure indicative of a fit │
│      between patient anatomy and virtual │
│      teeth setup, and              │
│    - a second measure indicating a │
│      probability of virtual teeth setup given │
│      a statistical model describing at least │
│      one of a shape of individual teeth, │
│      relations between shapes of   │
│      neighbouring teeth and/or relations │
│      between position and/or orientation of │
│      neighbouring teeth,           │
│ to adapt a virtual teeth setup to the intra-oral │
│ anatomical situation of the patient given the │
│ statistical model                  │
└─────────────────────────────────────┘
```

```
┌─────────────────────────────────────┐
│ estimating said shape, position and/or │
│ orientation of the tooth or teeth using the │
│ adapted virtual teeth setup resulting from │
│ said optimized energy function     │
└─────────────────────────────────────┘
```

Fig.2

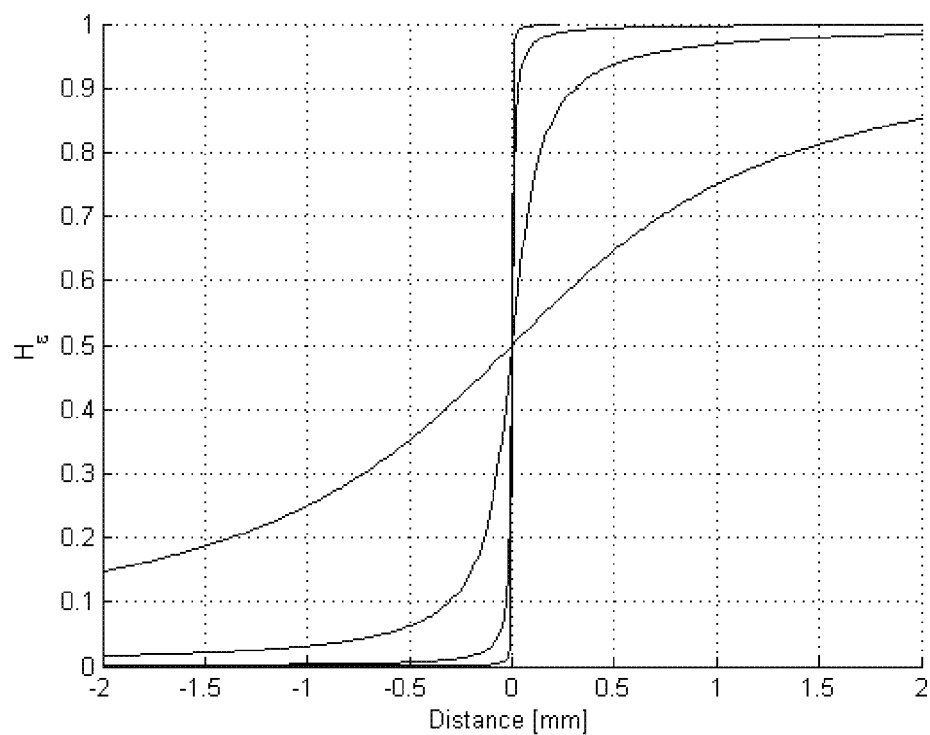
Fig. 9
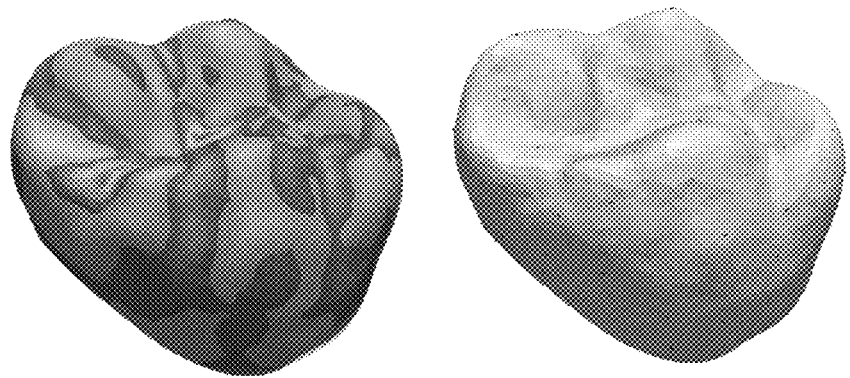
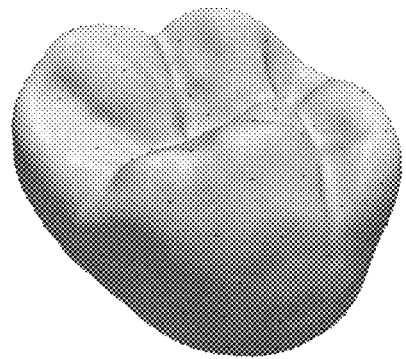
Fig. 10

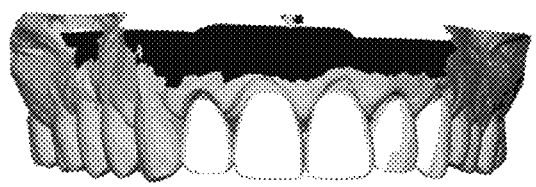
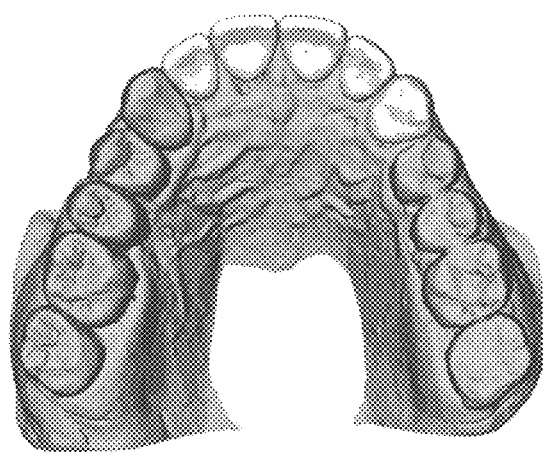
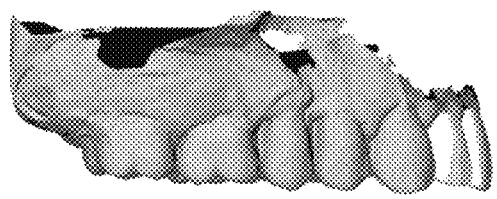
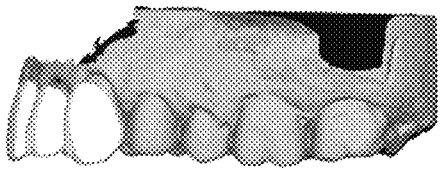
Fig. 12

METHOD FOR ESTIMATING AT LEAST ONE OF SHAPE, POSITION AND ORIENTATION OF A DENTAL RESTORATION

FIELD

The present application is generally related to the field of methods for determining a virtual teeth setup for prosthetic driven planning or orthodontic planning. The application is also related to the field of methods for segmenting intra-oral surface scans.

BACKGROUND

The prosthetic restoration of missing or corrupted teeth greatly affects the quality of life since teeth have a large influence on one's social interactions and well-being. This is due to the important functions of teeth, such as food digestion, speech and maintaining the shape of the lower face. A routinely used, reliable and well established technique for prosthetic restoration of teeth is based on dental implants. Dental implant based treatments target a functional and aesthetic outcome with minimal discomfort for the patient and short treatment times. A careful and detailed planning of the dental implants, as well as adequate tools to transfer the planning to the operating room are key factors for the success of the entire treatment. The accurate assessment of the patient's anatomy, often based on 3D medical images, is a prerequisite for such a planning. Various software systems exist for this task. These enable the clinician to work out an image guided digital planning of the dental implant treatment.

An essential concept in the implant planning procedure is the diagnostic teeth setup. A teeth setup is a collection of teeth, typically placed on a plaster model, in a similar setup compared to the anatomical situation of the patient. A diagnostic teeth setup contains the designed crowns of the teeth to be restored by prosthetic means. It is an important tool for anticipating on the outcome of the prosthetic treatment, and as such can provide input on the necessary means to reach the outcome. Additionally, it enables recognition of existing possibilities and limitations of the prosthetic treatment. The teeth to be restored by prosthetic means are positioned and shaped in a manner that is ideal both with respect to functional requirements, as well as aesthetic requirements. The most important functional requirements are a functional positioning and appropriate anatomical design of the teeth, and a correct resulting occlusion. The aesthetic requirements serve the purpose of not being able to discriminate between existing teeth and teeth restored by prosthetic means. The most important aesthetic requirements are a realistic positioning and modelling, similar type and characteristics to the remaining existing teeth, a naturally looking emergence profile and naturally looking papillae. These aesthetic requirements can be enhanced by the dynamic behaviour of the facial tissues, e.g. the smile.

With the advent of Computer Aided Design/Computer Aided Manufacturing (CAD/CAM) into the dental laboratories, a significant amount of work of the dental technician is shifted from manual towards digital processing. Likewise, the use of a manually sculpted diagnostic teeth setup on a plaster model has been replaced by a digitally designed teeth setup using surface scanned plaster models. A digitally designed teeth setup is advantageous both from a cost and time perspective. The resulting design can be exported as a three-dimensional surface model and milled or printed to serve as a try-on or as a final restoration.

A specific manual step of interest is the separation of the different teeth in a plaster dental cast. This step is essential in a digital setting as well. Therefore, the dental technician should be able to separate the different teeth in the digitized intra-oral surface of the patient. Separation of the intra-oral digital surface of the patient is commonly called segmentation. In general, the objective of surface segmentation is to partition a surface into a number of meaningful disjoint regions, thereby delineating anatomical structures of interest. Since manual segmentation methods are very time-consuming, can suffer from significant inter- and intra-operator variability and user fatigue, there is a strong need for automated or semi-automated surface segmentation algorithms. (Semi-)automated surface segmentation algorithms can as such provide the dental technician with an indispensable tool facilitating a large set of applications. In literature already a number of publications exist presenting various (semi-)automated segmentation algorithms for digital dental surfaces. One example is "*A medial point cloud based algorithm for dental cast segmentation*" (Kustra et al., Proc. Intl Conf. on Consumer Electronics (ICCE), pp. 331-334, 2014). The methods presented in the prior art publications all directly make use of the intra-oral digital surface of the patient.

Most of the dental implant planning software systems enable the clinician to import this diagnostic teeth setup into the planning software. In this case, the diagnostic teeth setup provides an essential input to the clinician during the treatment planning phase, as it allows for a truly bidirectional (or patient driven) planning. A bidirectional planning indicates the integration of detailed prosthetic and anatomical information of the patient in the implant planning phase.

In this description the term 'virtual ideal teeth setup' is used instead of the term digital diagnostic teeth setup. This allows discriminating between the outcome of the presented algorithm and a teeth setup created by a dental technician. Furthermore, the term virtual ideal teeth setup has a broader meaning as the remaining teeth of the patient are contained in the solution as well.

In the literature some related approaches have been presented. In the paper "*Bayes reconstruction of missing teeth*" (J. Sporring et al., J. Math. Imaging Vis. 31(2-3), pp. 245-254, 2008) statistical shape models with increased flexibility are applied. The paper presents a method to reconstruct the surface of a corrupted crown based on its remaining shape or on the shape of its neighbouring crowns using a set of predefined landmarks and a missing data problem approach. However, to be effective this approach requires the user to indicate on a surface representation of a patient's intra-oral region an important number of anatomical landmarks used for fitting the models.

Application WO2008/128700 describes a method for automated or semi-automated planning of a tooth setup. This method makes use of data of the dental area to be treated as well as of the face of the respective patient. Using a set of rules based on facial properties as well as the existing teeth, an initial tooth setup can be modified. At least one facial picture is required in the proposed method. Furthermore, the predefined rules can be subjective and not generally applicable (e.g. dependent on the origin of the patient).

In US2013/282351 a method is described for determining virtual tooth restorations based on scan data and a model database. The model database contains a number of parametrized tooth models for each tooth type. A virtual tooth restoration is obtained by fitting the model database to the specific case at hand in an iterative manner. The need for an elaborate model database makes the method more demanding from a computational point of view.

The shape and pose of the estimated prosthethic crown restorations is not optimal and requires (significant) further manual refinement by the user. Therefore there is a need for a method/algorithm for providing the user with one or more prosthetic crown restorations, whereby there is a reduced need for further refinement, such that these prosthethic restorations can be used for implant planning and/or directly as provisional restorations.

SUMMARY

It is an object of embodiments of the present invention to provide for an approach for estimating one or more pieces of information needed for performing a dental restoration for an at least partially edentulous patient. It is another object of embodiments of the invention to provide for a method for producing a dental restoration. It is a further object of embodiments of the invention to provide for a method for the placement of a dental restoration. It is also an object of embodiments of the invention to provide for a method for estimating at least one element of a shape, position and orientation of at least one tooth from a digitized intra-oral surface for an at least partially edentulous patient.

The above objective is accomplished by the solution according to certain embodiments of the present invention.

Certain embodiments of the present invention relate to a method for obtaining an estimation of the shape, position and/or orientation of one or more existing teeth of a patient or of one or more teeth to be included in a dental restoration destined to replace one or more missing teeth in a partially edentulous patient. The method preferably involves the use of a computing unit equipped to receive and process image information, preferably including 3D image information, including surface mesh representations, and digital medical image information, such as X-ray data, CT scan data and MRI data amongst others. It is further preferred that said computing unit is operationally connected to input devices and a display. Typically, the method involves the use of a user interface for receiving required user input and for presenting any information, including image information, used or generated by said method.

In short, the method of certain embodiments of the present invention involves the fitting of a virtual teeth setup to a digitized surface mesh of an intra-oral region of the patient, wherein said virtual teeth setup comprises separated surface meshes of individual teeth positioned in a dental arch or segment thereof. Preferably, said virtual teeth setup is a so-called 'mean virtual teeth setup', which is based on the computed mean shape, position and/or orientation for the teeth in a multitude of virtual teeth setups obtained by digitizing a multitude of intra-oral surfaces and separating the surface meshes of the individual teeth from said digitized surfaces, while maintaining their respective shape, position and orientation within the dental arch.

In case the method of certain embodiments of the present invention is used for estimating the shape, position and/or orientation of a tooth or teeth to be included in a said dental restoration, said digitized intra-oral region of the patient should comprise the region of the missing teeth next to at least one remaining tooth, which can be used by the fitting algorithm of certain embodiments of the present invention to fit the virtual teeth setup to the patient's intraoral situation. The fitting algorithm eventually provides an adapted virtual teeth setup matching the patient's intraoral situation and approaching an ideal or 'natural' teeth setup. The shape, position and/or orientation of a tooth or teeth to be included in a dental restoration can subsequently be estimated based on the shape, position and/or orientation of the tooth or teeth in said adapted virtual teeth setup, which correspond to the patient's missing teeth. Typically, the method of certain embodiments of the present invention involves displaying the teeth of the adapted virtual teeth setup on a surface representation of the patient's intraoral situation allowing a practitioner to visually inspect the estimates as proposed by the method of certain embodiments of the present invention. Such visual representation on a surface representation of the patient's intraoral situation is particularly useful when virtually planning the position and orientation of dental implants in a patient's jaw using an image guided digital planning system such as NobelClinician™. Indeed, this visual information on the shape, position and orientation of the tooth or teeth of an eventual restoration allows the practitioner to consider this information while planning the position and orientation of the implants in view of an optimal clinical and aesthetic result.

In case the method is used to estimate the shape, position and/or orientation of one or more existing teeth said digitized intra-oral region of the patient should at least comprise the teeth for which such estimation is needed, however, the presence of additional teeth of the patient in said region may also be used by the fitting algorithm and may contribute to the accuracy of the estimation. The fitting algorithm eventually provides an adapted virtual teeth setup matching the patient's one or more existing teeth. The shape, position and/or orientation of each of said one or more patient's existing teeth can subsequently be estimated based on the respective shapes, positions and/or orientations of the corresponding teeth in said adapted virtual teeth setup. Interestingly, said adapted virtual teeth setup comprises separated surface meshes of individual teeth. In consequence, said virtual teeth setup also provides a representation of the patient's intraoral situation wherein the teeth are segmented, which allows to virtually manipulate the position and orientation of the individual teeth. As such the method according to certain embodiments of the present invention provides a valuable tool in the planning of orthodontic interventions.

In a first main aspect certain embodiments of the present invention provide a computer assisted method for estimating at least one element of a shape, position and orientation of a dental restoration for a partially edentulous patient using a digitized representation of an intra-oral surface of a patient. Typically, the method of certain embodiments of the present invention involves the estimation of the position, orientation and/or shape of at least one tooth of said dental restoration. This method generally comprises following steps:

indicating one or more teeth requiring a dental restoration, for which an estimation of said at least one element is needed, and indicating a remaining tooth or remaining teeth available for estimating. Typically, a user can indicate said teeth requiring a dental restoration and said remaining teeth by inputting the anatomical names of the teeth or the teeth positions in accordance with a dental chart corresponding to the dentition of the patient. In a particular embodiment a user interface is provided allowing the user to indicate said teeth by selecting the corresponding teeth in a representation of a dental chart.

providing a virtual teeth setup comprising teeth corresponding to the one or more teeth requiring said dental restoration as well as teeth corresponding to the selected remaining tooth or teeth, wherein said virtual teeth setup comprises separated surface meshes of individual teeth positioned in a dental arch or segment thereof. Preferably, said virtual teeth setup corresponds to a same dentition as that of the patient. It is further preferred that said virtual teeth setup is a so-called mean virtual teeth setup, which is based on the computed mean shape, position and orientation for the teeth in a multitude of virtual teeth setups obtained by digitizing a multitude of intra-oral surfaces and separating the surface meshes of the individual teeth from said digitized surfaces, while maintaining their shape, position and orientation within the dental arch. Preferably, said multitude of digitized intra-oral surfaces are obtained from individuals, which in view of the governing dental insights are considered to have a near-ideal teeth setup.

providing a digitized surface mesh of an intra-oral region of said patient comprising said selected remaining tooth or teeth and the region of the one or more teeth requiring said dental restoration. Typically, such digitized surface mesh of an intra-oral region of the patient is obtained by scanning a dental impression of the patient's teeth and soft tissue or by scanning a cast of such impression. Alternatively, said digitized surface mesh is derived from medical image data, such as from CT scan data of a patient's intraoral cavity or more preferably from scanning said intra-oral region using an intra-oral scanner.

Optionally, aligning said digitized surface mesh of the intra-oral region of the patient with said virtual teeth setup. Aligning said digitized surface mesh with said virtual teeth setup preferably involves the matching of one or more landmarks on at least one tooth, preferably on at least two teeth, more preferably on at least 3 teeth of said digitized surface mesh with one or more corresponding landmarks on corresponding tooth or teeth of the virtual teeth setup. In order to enable such matching of landmarks it is preferred that a user indicates such one or more landmarks on one or more teeth of the digitized surface mesh wherein said landmarks correspond with predefined landmarks on the virtual teeth setup. In a particular embodiment said one landmark is the midpoint of the upper crown surface.

applying and optimizing an energy function, representing a quality measure for said virtual teeth setup, to adapt said virtual teeth setup to the intra-oral anatomical situation of the patient, said adaptation comprising adapting the virtual teeth setup to one or more of said selected one or more remaining teeth in said digitized surface mesh of the intra-oral region of said patient given a statistical model, which describes for a given dentition or segment thereof a probability distribution for at least the shapes of individual teeth, the relations between shapes of neighbouring teeth and/or relations between positions and/or orientations of neighbouring teeth, said energy function comprising a first measure indicative of a fit between said patient's anatomy and said adapted virtual teeth setup, and a second measure indicating a probability of said adapted virtual teeth setup given said statistical model. Typically, optimizing said energy function is an iterative process, wherein said energy function is repeatedly applied on intermediate virtual teeth setups in order to obtain an adapted virtual teeth setup resulting from said optimized energy function, which approaches an ideal teeth setup for said patient. The optimisation process may be continued until the change between subsequent iterations falls below a given threshold, preferably a user set threshold. Alternatively, the optimisation process may be continued until a maximum number of iterations is reached, preferably this number is set by the user. In a particular embodiment, the optimisation continues until the change between subsequent iterations falls below a given threshold, preferably a user set threshold or until a maximum number of iterations, said maximum preferably being set by the user, is reached, whichever occurs first. This approach enables to obtain a near ideal solution in most cases while at the same time controlling the run time of the algorithm.

estimating said at least one element of said shape, position and orientation of said dental restoration using the adapted virtual teeth setup resulting from said optimized energy function. Typically, the position, orientation and/or shape of the tooth or teeth of the dental restoration requiring estimation are estimated from the position, orientation and/or shape of the corresponding tooth or teeth of the adapted virtual teeth setup.

The proposed solution indeed allows obtaining an estimation of the shape, position or orientation, or a combination thereof, of a dental restoration. More particularly, in certain embodiments, the present method allows providing such estimation of the shape, position and/or orientation for each of the individual teeth in such restoration. These estimates are typically based on the respective shapes, positions and/or orientations of the corresponding tooth or teeth in said adapted virtual teeth setup resulting from said optimized energy function. As explained above in a first step of the present method the user indicates one or more teeth which need an estimation of shape and/or position and/or orientation, as well as one or more remaining teeth which can be used for carrying out the estimation. Typically, said teeth, which need an estimation of shape and/or position and/or orientation, correspond to one or more of the patient's missing teeth to be replaced by said restoration. The present method adopts an energy based approach, wherein an energy function is formulated, that serves as a quality measure for a given virtual teeth setup in view of the intra-oral situation of the patient as provided by a digitized surface mesh of the intra-oral region of said patient comprising said selected remaining tooth or teeth and the region of the one or more teeth requiring said dental restoration. The energy function is applied and optimized to adapt a virtual teeth setup to the specific case at hand, i.e. to the indicated remaining tooth/teeth as provided in said digitized surface mesh of the patient's intra-oral situation. The energy measure comprises at least a measure indicative of the fit between the patient's anatomy and the virtual teeth setup and a measure accounting for the probability of the virtual teeth setup given the model as mentioned above. The virtual teeth setup algorithm according to certain embodiments of this invention enables a clinician to design a dental restoration in a semi-automated manner. The dental restoration may be a prosthetic crown, bridge or denture.

The shape, position and/or orientation of a tooth or teeth to be included in a dental restoration can subsequently be estimated based on the shape, position and/or orientation of the tooth or teeth in said adapted virtual teeth setup, which correspond to the patient's missing teeth. Typically, the method of certain embodiments of the present invention involves displaying the teeth of the adapted virtual teeth setup on a surface representation of the patient's intraoral situation allowing a practitioner to visually inspect the estimates as proposed by the method of certain embodiments of the present invention. In a preferred embodiment a tooth of the virtual teeth setup is represented, preferably in relation to a surface representation of the patient's intraoral situation, by at least one of a translation vector, a rotation matrix and a polygonal surface mesh representing the shape of said tooth. Advantageously all three are used in the representation. Doing so allows for an improved flexibility and adaptability of such represented tooth. Indeed, such representation of the tooth within a user interface enabling the user to modify the position, orientation or shape of the represented tooth enables a clinician to introduce minor modifications to the proposed solution in view of for instance constraints associated with the implants or because of personal aesthetic preferences of the patient. Such modifications can subsequently be stored for later use in the planning of a maxillofacial intervention or for the design and/or production of an eventual dental restoration. Furthermore, these modifications can also be used to generate an updated estimation of said one element of a shape, position and orientation of a dental restoration as described below.

In a particular embodiment the method of the present for estimating a dental restoration comprises further steps of updating an initially estimated one element of a shape, position and orientation of a dental restoration. In a first step such re-estimation comprises receiving user input modifying at least one of a shape, position and orientation of a tooth requiring dental restoration as estimated for said tooth using the adapted teeth setup resulting from the optimized energy function of said initial estimation. A following step involves applying and optimizing a second energy function, representing a quality measure for said adapted virtual teeth setup, to further adapt said adapted virtual teeth setup to the intra-oral anatomical situation of the patient. This further adaptation comprises adapting the adapted virtual teeth setup to said selected one or more remaining teeth in the digitized surface mesh of the intraoral region of the patient considering the constraint provided by said user-inputted modification for a said tooth and given the previously specified statistical model. The second energy function preferably comprises a first measure indicative of a fit between said patient's anatomy and said further adapted virtual teeth setup given said constraint, and a second measure indicating a probability of said further adapted virtual teeth setup given said statistical model. Finally, the at least one element of said shape, position and orientation of said dental restoration is re-estimated using the further adapted virtual teeth setup resulting from said optimized second energy function. Said inputted modification of at least one of a shape, position and orientation for a tooth requiring restoration can be used as a hard or soft constraint in said further adaptation. When it is used as a hard constraint the updated estimation shall comprise the received modifications as inputted. However, when it is used as a soft constraint an updated estimation is generated comprising a solution in between the initial estimation and the inputted modification.

The first measure of the energy function typically comprises a landmark term indicative of a distance between corresponding landmarks on the virtual teeth setup and on the digitized surface mesh of the patient's intra-oral region. Alternatively, said first measure comprises a surface term indicating, for points of said virtual teeth setup, a distance to the digitized surface mesh of the patient's intra-oral region. In one embodiment the surface term is derived from a diagnostic teeth setup. Advantageously, said first measure of the energy function comprises both a landmark and a surface term.

The second measure of the energy function is typically composed of three separate terms, one for each of the three possible constituting parts of the statistical model, said terms respectively take into consideration the probability distribution for the shapes of individual teeth, the relations between shapes of neighbouring teeth and/or relations between positions and/or orientations of neighbouring teeth.

The energy function may further comprise a contact point term providing a measure for a distance between contact point sets of neighbouring teeth.

In certain embodiments the energy function also comprises a symmetric pose term giving a symmetry measure for the position and/or orientation of two contralateral teeth. The energy function may further comprise a symmetric shape term giving a symmetry measure for the shape of two contralateral teeth.

Advantageously, the energy function takes into account one or more heuristic rules defining a relation between the positions of predefined landmarks on the teeth of a said virtual teeth setup, preferably of an adapted virtual teeth setup. Advantageously, the energy function takes into account one or more heuristic rules defining a relation between distances in-between predefined landmarks on the teeth of a said virtual teeth setup, preferably of an adapted virtual teeth setup.

An important element to consider in the design of a dental restoration is the occlusion between the restoration and the antagonist teeth, in view of this it is advantageous when the energy function also comprises an antagonist overlap term to penalize overlap of teeth with an antagonist surface.

In another embodiment the method comprises a first postprocessing step to prevent neighbouring teeth from overlapping with each other by iteratively detecting maximal overlapping points and modifying the shapes of said overlapping teeth to remove said overlap.

In another embodiment the method comprises a second postprocessing step to take into account a shape of an antagonist crown of a tooth in said adapted virtual teeth setup by defining occlusal contact points and deforming the shape of said tooth to obtain desirable occlusal contact at said defined contact points.

In another embodiment the method comprises fitting of one or more corresponding crowns from a library to one or more teeth of an adapted virtual teeth setup. The fitting of such library teeth to a tooth of the adapted virtual teeth setup, which corresponds to a tooth to be included in a dental restoration has the advantage that it allows to regain certain anatomic tooth details that may have been lost in the optimization procedure when they have not been captured by the statistical models describing the shape of individual teeth.

In one embodiment the method for estimating comprises a step of planning a dental implant based treatment based on the obtained estimation of the at least one element of shape, position and orientation.

Advantageously, the method comprises exporting the estimated at least one element of the dental restoration. The method then preferably comprises a step of producing the dental restoration or a part thereof based on the exported estimated at least one element of the dental restoration.

In another aspect of certain embodiments the invention relates to a method for performing a dental restoration, wherein the estimation of the at least one element of shape, position and orientation is used, obtained from the method as previously described.

In another aspect of certain embodiments the invention relates to a program, executable on a programmable device containing instructions, which when executed, perform the method as previously described.

In another aspect of certain embodiments the invention relates to a method for producing a dental restoration, comprising estimating at least one element of shape, position and orientation of the dental restoration with the method as described above, and producing the dental restoration using the estimated at least one element. In another aspect the invention relates to a dental restoration produced with this method.

In another aspect of certain embodiments the invention relates to a method for placement of a dental restoration, comprising estimating at least one element of shape, position and orientation of said dental restoration with the method as described, and placing the dental restoration using the estimated at least one element.

In a second main aspect of certain embodiments the present invention provides a computer based method for estimating at least one element of a shape, position and orientation of one or more teeth from a digitized intra-oral surface of a patient. This method comprises following steps:

receiving user input indicating the one or more teeth which require said estimation. Typically, a user can indicate said teeth by inputting the anatomical names of the teeth or the teeth positions in accordance with a dental chart corresponding to the dentition of the patient. In a particular embodiment, a user interface is provided allowing the user to indicate said teeth by selecting the corresponding teeth in a representation of a dental chart.

providing a virtual teeth setup comprising teeth corresponding to said one or more teeth requiring said estimation, wherein said virtual teeth setup comprises separated surface meshes of individual teeth positioned in a dental arch or segment thereof. Preferably, said virtual teeth setup corresponds to a same dentition as that of the patient. It is further preferred that said virtual teeth setup is a so-called mean virtual teeth setup, which is based on the computed mean shape, position and orientation for the teeth in a multitude of virtual teeth setups obtained by digitizing a multitude of intra-oral surfaces and separating the surface meshes of the individual teeth from said digitized surfaces, while maintaining their shape, position and orientation within the dental arch. Preferably, said multitude of digitized intra-oral surfaces are obtained from individuals, which in view of the governing dental insights are considered to have a near-ideal teeth setup.

providing a digitized surface mesh of an intra-oral region of said patient comprising said one or more indicated teeth requiring said estimation. Typically, such digitized surface mesh of an intra-oral region of the patient is obtained by scanning a dental impression of the patient's teeth and soft tissue or by scanning a cast of such impression. Alternatively, said digitized surface mesh is derived from medical image data, such as from CT scan data of a patient's intraoral cavity or more preferably from scanning said intra-oral region using an intra-oral scanner.

Optionally, aligning said digitized surface mesh of the intra-oral region of the patient with said virtual teeth setup. Aligning said digitized surface mesh with said virtual teeth setup preferably involves the matching of one or more landmarks on at least one tooth, preferably on at least two teeth, more preferably on at least 3 teeth of said digitized surface mesh with one or more corresponding landmarks on corresponding tooth or teeth of the virtual teeth setup. In order to enable such matching of landmarks it is preferred that a user indicates such one or more landmarks on one or more teeth of the digitized surface mesh wherein said landmarks correspond with predefined landmarks on the virtual teeth setup. In a particular embodiment said one landmark is the midpoint of the upper crown surface.

applying and optimizing an energy function, representing a quality measure for said virtual teeth setup, to adapt said virtual teeth setup to the intra-oral anatomical situation of the patient, said adaptation comprising adapting the virtual teeth setup to said one or more indicated teeth in said digitized surface mesh of the intra-oral region of said patient given a statistical model, which describes for a given dentition or segment thereof a probability distribution for at least the shapes of individual teeth, the relations between shapes of neighbouring teeth and/or relations between positions and/or orientations of neighbouring teeth, said energy function comprising a first measure indicative of a fit between said patient's anatomy and said virtual teeth setup, and a second measure indicating a probability of said adapted virtual teeth setup given said statistical model. Typically, optimizing said energy function is an iterative process, wherein said energy function is repeatedly applied on intermediate virtual teeth setups in order to obtain an adapted virtual teeth setup resulting from said optimized energy function, which approaches an ideal teeth setup for said patient. The optimisation process may be continued until the change between subsequent iterations falls below a given threshold, preferably a user set threshold. Alternatively, the optimisation process may be continued until a maximum number of iterations is reached, preferably this number is set by the user. In a particular embodiment, the optimisation continues until the change between subsequent iterations falls below a given threshold, preferably a user set threshold or until a maximum number of iterations, said maximum preferably being set by the user, is reached, whichever occurs first. This approach enables to obtain a near ideal solution in most cases while at the same time allowing controlling the run time of the algorithm.

estimating said at least one element of said shape, position and orientation for said at least one tooth using said adapted virtual teeth setup in accordance with said optimized energy function. Typically, the position, orientation and/or shape of said tooth or teeth requiring estimation are estimated from the position, orientation and/or shape of the corresponding tooth or teeth of the adapted virtual teeth setup.

The proposed approach makes use of a template dental arch with individual teeth, also termed virtual teeth setup, which is fit to the digitized intra-oral situation of the patient. In consequence, the obtained adapted virtual teeth setup provides a digitized surface mesh representing the intra-oral region of the patient wherein said one or more teeth are available as separated or segmented surface meshes of individual teeth. This has a number of advantages. First, full crown information is available, whereas the segmentation results obtained by prior art methods lack information at the level of the interstices. Some of these prior art methods try to estimate the shape of the crowns at the interstices in a separate step. However, the approach according to certain embodiments of this invention is able to estimate the shape at the interstices in a single step. Moreover, due to the nature of the proposed technique, this estimation is based on knowledge acquired from an extensive training data set of crowns. Second, certain embodiments of the present invention are robust against artefacts present in the digital intraoral surface scans resulting from the digitization technique, e.g. holes, intersections, etc. Third, this method can provide for each tooth in said adapted virtual teeth setup a shape, position and orientation, which might be very useful for further applications, e.g. orthodontics. The virtual teeth setup provides a representation of the patient's intraoral situation or part thereof wherein the teeth are segmented, which allows to virtually manipulate the position and orientation of the individual teeth. As such this method provides a valuable tool in the planning of orthodontic interventions.

The first measure of the energy function used in the method according to this second main aspect typically comprises a landmark term indicative of a distance between corresponding landmarks on the virtual teeth setup and on digitized surface mesh of the patient's intra-oral region. Alternatively, said first measure comprises a surface term indicating, for points of said virtual teeth setup, a distance to the digitized surface mesh of the patient's intra-oral region. In one embodiment the surface term is derived from a diagnostic teeth setup. Advantageously, said first measure of the energy function comprises both a landmark and a surface term.

The second measure of the energy function used in the method according to this second main aspect is typically composed of three separate terms, one for each of the three possible constituting parts of the statistical model, said terms respectively take into consideration the probability distribution for the shapes of individual teeth, the relations between shapes of neighbouring teeth and/or relations between positions and/or orientations of neighbouring teeth.

The energy function may further comprise a contact point term providing a measure for a distance between contact point sets of neighbouring teeth.

In certain embodiments of the method according to this second main aspect, the energy function also comprises a symmetric pose term giving a symmetry measure for the position and/or orientation of two contralateral teeth. The energy function may further comprise a symmetric shape term giving a symmetry measure for the shape of two contralateral teeth.

Advantageously, the energy function used in the method according to this second main aspect takes into account one or more heuristic rules defining a relation between the positions of predefined landmarks on the teeth of a said virtual teeth setup, preferably of an adapted virtual teeth setup. Advantageously, the energy function takes into account one or more heuristic rules defining a relation between distances in-between predefined landmarks on the teeth of a said virtual teeth setup, preferably of an adapted virtual teeth setup.

In another embodiment the method according to this second main aspect comprises a first postprocessing step to prevent neighbouring teeth from overlapping with each other by iteratively detecting maximal overlapping points and modifying the shapes of said overlapping teeth to remove said overlap.

In a particular embodiment the method according to this second embodiment of the present invention comprises in further steps generating a virtual modification of at least one element of a shape, position and orientation of one or more teeth in a said digitized intraoral surface of a patient. The generation of such virtual modification comprises in an initial step the receipt of user input virtually modifying one of the shape, position and orientation of an indicated tooth as estimated for a said tooth using the adapted teeth setup resulting from the optimized energy function of the initial estimation. A following step involves applying and optimizing a second energy function, representing a quality measure for the adapted virtual teeth setup, to further adapt the adapted virtual teeth setup to said user-inputted virtual modification of the intraoral anatomical situation of the patient. This further adaptation comprising adapting the adapted virtual teeth setup to said one or more indicated teeth in said digitized surface mesh of the intra-oral region considering the constraint provided by the inputted modification for a said tooth and given the previously specified statistical model. The second energy function preferably comprises a first measure indicative of a fit between the patient's anatomy and the further adapted virtual teeth setup given said constraint, and a second measure indicating a probability of said further adapted virtual teeth setup given said statistical model. Finally, the at least one element of said shape, position and orientation of one or more teeth in said digitized intra-oral surface of a patient is re-estimated using the further adapted virtual teeth setup resulting from said optimized second energy function. An inputted modification of at least one of a shape, position and orientation of an indicated tooth can be used as a hard or soft constraint in said further adaptation. When it is used as a hard constraint the updated estimation shall comprise the received modifications as inputted. However, when used as a soft constraint an updated estimation is generated comprising a solution in between the initial estimation and the inputted modification.

The statistical model used in the methods of the first and second aspect of certain embodiments of the invention are typically constructed by performing a training phase. Said training phase preferably comprises following steps:

providing a multitude of virtual teeth setups corresponding to a collection of digital surface meshes of teeth setups obtained from different individuals, which each preferably have a near-ideal teeth setup. It is further preferred that in said virtual teeth setups the individual teeth are available as separated surface meshes, computing a mean virtual teeth setup from said multitude of virtual teeth setups. Preferably, said virtual teeth setups are aligned to a same reference frame prior to the computing of said mean setup.

computing from said multitude of virtual teeth setups the probability distribution for at least the shapes of individual teeth, the relations between shapes of neighbouring teeth and/or relations between positions and/or orientations of neighbouring teeth.

Said multitude of virtual teeth setups used in the training phase are typically obtained in a first step by scanning dental impressions of teeth and soft tissue of different individuals sharing a same dentition or by scanning casts of such impressions. Alternatively, said multitude of virtual teeth setups are derived from medical image data, such as from CT scan data of the intraoral cavity of different individuals or more preferably from scanning the dental arch using an intra-oral scanner. Preferably, said individuals are considered to have a near-ideal teeth setup in accordance to the governing dental insights. Thereafter, the individual teeth surfaces are segmented out of the acquired surface representations in order to obtain said multitude of digital surface meshes of different, preferably near-ideal, teeth setups and wherein the individual teeth are available as separated surface meshes. Preferably, in a final step the interstices in said digital surface meshes are inspected and if needed completed at said interstice level.

It is further preferred that said methods according to the first and second main aspect of certain embodiments of the invention comprise an optimization of the energy function using a line search method.

Further aspects of certain embodiments of the present invention relate to the following items.

A. Method for estimating at least one element of a shape, position and orientation of a dental restoration for an at least partially edentulous patient, the method comprising selecting a tooth or teeth which need an estimation of said at least one element of said dental restoration and selecting a remaining tooth or teeth available for estimating, applying an energy function, representing a quality measure of a virtual teeth setup comprising said one or more remaining teeth and at least one tooth requiring said dental restoration, to adapt said virtual teeth setup to one or more of said selected one or more remaining teeth of said patient given a statistical model describing at least one of a shape of individual teeth of said virtual teeth setup, relations between shapes of neighbouring teeth of said virtual teeth setup and/or relations between position and/or orientation of neighbouring teeth of said virtual teeth setup, said energy function comprising a first measure indicative of a fit between said patient's anatomy and said virtual teeth setup, and a second measure indicating a probability of said virtual teeth setup given said statistical model, estimating said at least one element of said shape, position and orientation of said dental restoration resulting from said energy function.

In particular, this item A of certain embodiments of the invention relates to a computer assisted method for estimating at least one element of a shape, position and orientation of a dental restoration for a partially edentulous patient, the method comprising indicating one or more teeth requiring a dental restoration, for which an estimation of said at least one element is needed, and indicating a remaining tooth or remaining teeth available for estimating, providing a virtual teeth setup comprising teeth corresponding to the one or more teeth requiring said dental restoration as well as teeth corresponding to the selected remaining tooth or teeth, wherein said virtual teeth setup comprises separated surface meshes of individual teeth positioned in a dental arch or segment thereof;

providing a digitized surface mesh of an intra-oral region of said patient comprising said selected remaining tooth or teeth and the region of the one or more teeth requiring said dental restoration;

applying and optimizing an energy function, representing a quality measure for said virtual teeth setup, to adapt said virtual teeth setup to the intra-oral anatomical situation of the patient, said adaptation comprising adapting the virtual teeth setup to one or more of said selected one or more remaining teeth in said digitized surface mesh of the intra-oral region of said patient given a statistical model, which describes for a given dentition or segment thereof a probability distribution for at least the shapes of individual teeth, the relations between shapes of neighbouring teeth and/or relations between positions and/or orientations of neighbouring teeth, said energy function comprising a first measure indicative of a fit between said patient's anatomy and said adapted virtual teeth setup, and a second measure indicating a probability of said adapted virtual teeth setup given said statistical model, estimating said at least one element of said shape, position and orientation of said dental restoration using the adapted virtual teeth setup resulting from said optimized energy function.

B. Method for estimating as in A, wherein said second measure of said energy function is composed of three separate terms corresponding to said shape of said individual teeth, said relations between said shapes of said neighbouring teeth and said relations between said position and/or orientation of said neighbouring teeth, respectively.

C. Method for estimating as in A or B, wherein a state is assigned to each of said virtual teeth setup, said state being active, passive or idle.

D. Method for estimating as in any of the previous items, comprising a postprocessing step to prevent neighbouring teeth from overlapping with each other by iteratively detecting maximal overlapping points and modifying said tooth shape to remove said overlap.

E. Method for estimating as in any of the previous items, comprising a postprocessing step to take into account a shape of an antagonist crown by defining occlusal contact points and deforming said shape of said tooth to obtain perfect occlusal contact at said defined contact points.

F. Method for estimating as in any of the previous items, comprising a fitting of a crown from a library.

G. Method for estimating as in any of the previous items, comprising a step of planning a dental implant based treatment based on the obtained estimation of said at least one element of shape, position and orientation.

H. Method for estimating as in any of the previous items, comprising a step of exporting said estimated at least one element of said dental restoration. Optionally, this comprises a step of producing said dental restoration based on said exported estimated at least one element of said dental restoration.

I. Method for performing a dental restoration, wherein the estimation of said at least one element of shape, position and orientation is used, obtained from the method as in any of items A to H.

J. Method for producing a dental restoration, comprising estimating at least one element of shape, position and orientation of said dental restoration with the method as in any of items A to H, producing said dental restoration using said estimated at least one element.

K. Method for placement of a dental restoration, comprising estimating at least one element of shape, position and orientation of said dental restoration with the method as in any of items A to H, placing said dental restoration using said estimated at least one element.

L. Method for estimating at least one element of a shape, position and orientation of at least one tooth from a digitized intra-oral surface for an at least partially edentulous patient, said method comprising selecting a tooth or teeth which need an estimation of said at least one element of said at least one tooth, applying an energy function, representing a quality measure of a virtual teeth setup comprising said at least one tooth, to adapt said virtual teeth setup given a statistical model describing at least one of a shape of individual teeth of said virtual teeth setup, relations between shapes of neighbouring teeth of said virtual teeth setup and/or relations between position and/or orientation of neighbouring teeth of said virtual teeth setup, said energy function comprising a first measure indicative of a fit between said digitized intra-oral surface and said virtual teeth setup, and a second measure indicating a probability of said virtual teeth setup given said statistical model, estimating said at least one element of shape, position and orientation of said at least one tooth resulting from said energy function.

In particular, this item L of certain embodiments of the invention relates to a computer based method for estimating at least one element of a shape, position and orientation of one or more teeth from a digitized intra-oral surface of a patient, said method comprising indicating the one or more teeth which require said estimation, providing a virtual teeth setup comprising teeth corresponding to said one or more teeth requiring said estimation, wherein said virtual teeth setup comprises separated surface meshes of individual teeth positioned in a teeth arch or segment thereof;

providing a digitized surface mesh of an intra-oral region of said patient comprising said one or more indicated teeth requiring said estimation;

applying and optimizing an energy function, representing a quality measure for said virtual teeth setup, to adapt said virtual teeth setup to the intra-oral anatomical situation of the patient, said adaptation comprising adapting the virtual teeth setup to said one or more indicated teeth in said digitized surface mesh of the intra-oral region of said patient given a statistical model, which describes for a given dentition or segment thereof a probability distribution for at least the shapes of individual teeth, the relations between shapes of neighbouring teeth and/or relations between positions and/or orientations of neighbouring teeth, said energy function comprising a first measure indicative of a fit between said patient's anatomy and said virtual teeth setup, and a second measure indicating a probability of said adapted virtual teeth setup given said statistical model, estimating said at least one element of said shape, position and orientation for said at least one tooth using said adapted virtual teeth setup resulting from said optimized energy function.

M. Method according to item L wherein said adapted virtual teeth setup provides a digitized surface mesh representing the intra-oral region of said patient wherein said one or more teeth are available as separated surface meshes of individual teeth.

N. Method for estimating as in item M, comprising a step of planning an orthodontic treatment based on the obtained estimation of said at least one element of position and orientation.

O. Method for estimating as in item M or N, comprising a step of exporting said estimated at least one element of said orthodontic treatment.

P. Method for estimating as in any of the previous items, wherein a tooth of said virtual teeth setup is represented by at least one of a translation vector, a rotation matrix and a polygonal surface mesh representing the shape of said tooth.

Q. Method for estimating as in any of the previous items, wherein said first measure comprises a landmark term indicative of a distance between corresponding landmarks on said virtual teeth setup and on said patient's anatomy.

R. Method for estimating as in any of the previous items, wherein said first measure comprises a surface term indicating, for points of said virtual teeth setup, a distance to an anatomical surface mesh representing an intra-oral situation of said patient.

S. Method for estimating as in claim R, wherein said surface term is derived from a diagnostic teeth setup.

T. Method for estimating as in any of the previous items, wherein said energy function comprises a contact point term providing a measure for a distance between contact point sets of neighbouring teeth.

U. Method for estimating as in any of the previous items, wherein said energy function comprises a symmetric pose term giving a symmetry measure for the position and/or orientation of two contralateral teeth.

V. Method for estimating as in any of the previous items, wherein said energy function comprises a symmetric shape term giving a symmetry measure for the shape of two contralateral teeth.

W. Method for estimating as in any of the previous items, wherein said energy function takes into account one or more heuristic rules defining a relation on a position of predefined landmarks on teeth of said virtual teeth setup.

X. Method for estimating as in any of the previous items, wherein said energy function takes into account one or more heuristic rules defining a relation on distances between predefined landmarks on teeth of said virtual teeth setup.

Y. Method for estimating as in any of the previous items, wherein said energy function comprises an antagonist overlap term to penalize overlap of teeth with an antagonist surface.

Z. Method for estimating as in any of the previous items, wherein a training phase is performed to construct said statistical model.

AA. Method for estimating as in item Z, wherein said training phase is performed using surface scans.

BB. Method for estimating as in claim Z or AA, wherein data resulting from said training phase are mirrored using a mirror plane derived from anatomical landmarks.

CC. Method for estimating as in claim AA or BB, wherein from a surface mesh of said dental casts individual teeth surfaces are extracted.

DD. Method for estimating as in item CC, wherein said extracted teeth surfaces are completed at interstice level.

EE. Method for estimating as in any of claims Z to DD, wherein said data resulting from said training phase are positioned in a same reference frame.

FF. Method for estimating as in item EE, wherein said positioning involves computing a mean virtual teeth setup and positioning said mean virtual teeth setup.

GG. Method for estimating as in any of the previous items, further comprising an optimization of said energy function using a line search method.

HH. Method for estimating as in any of the previous items, wherein applying said energy function comprises an optimization over at least one element of a shape, position and orientation of said one or more remaining teeth of said first measure and said second measure.

II. Method for estimating as in any of the previous items, wherein applying said energy function comprises an optimization over said at least one element of said dental restoration of said second measure.

JJ. Program, executable on a programmable device containing instructions, which when executed, perform the method as in any of the previous items.

KK. Dental restoration produced with the method as in item J.

For purposes of summarizing certain embodiments of the invention and the advantages achieved over the prior art, certain objects and advantages of certain embodiments of the invention have been described herein above. Of course, it is to be understood that not necessarily all such objects or advantages may be achieved in accordance with any particular embodiment of the invention. Thus, for example, those skilled in the art will recognize that certain embodiments of the invention may be embodied or carried out in a manner that achieves or optimizes one advantage or group of advantages as taught herein without necessarily achieving other objects or advantages as may be taught or suggested herein.

The above and other aspects of certain embodiments of the invention will be apparent from and elucidated with reference to the embodiment(s) described hereinafter.

BRIEF DESCRIPTION OF THE DRAWINGS

Certain embodiments of the invention will now be described further, by way of example, with reference to the accompanying drawings, wherein like reference numerals refer to like elements in the various figures.

FIG. 2 illustrates the main steps of an embodiment of the proposed algorithm for estimating at least one element of a shape, position and orientation of at least one tooth from a digitized intra-oral surface.

FIG. 9 illustrates the regularized Heaviside step function for $\varepsilon$ equal to 1.0, 0.1, 0.01, and 0.001.

FIG. 10 illustrates the computation of the corresponding points between a crown from the virtual teeth setup and a library crown.

FIG. 12 illustrates the results of the algorithm on a challenging case.

DETAILED DESCRIPTION OF ILLUSTRATIVE EMBODIMENTS

Figure 1:
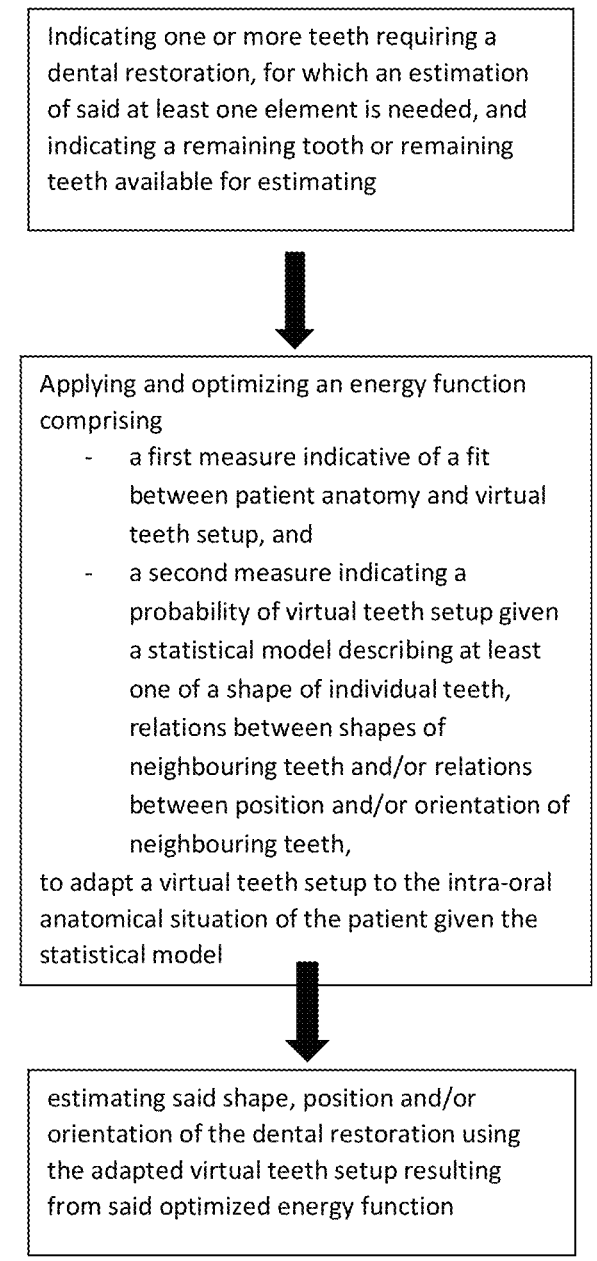
FIG. 1 illustrates the main steps of an embodiment of the proposed algorithm for estimating at least one of shape, position and orientation of a dental restoration.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to certain embodiments of the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of certain embodiments of the invention should not be taken to imply that the terminology is being re-defined herein to be restricted to include any specific characteristics of the features or aspects of certain embodiments of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present disclosure presents a technique for determining a virtual ideal teeth setup, corresponding to the adapted virtual teeth setup resulting from an optimized energy function. The proposed algorithm takes into account both the functional and aesthetic requirements as well as the existing anatomy of the patient. More specifically, the proposed method estimates the optimal shape and pose (position and orientation) of one or more prosthetic crown restorations or other dental restorations given sufficient anatomical information of an at least partially edentulous patient and a minimal amount of user interaction. This user input concerns specifying the teeth for which prosthetic restorations need to be estimated as well as the remaining teeth that can be used by the algorithm. This is the first step shown in the flow chart of FIG. 1. Preferably, the user also indicates some points, typically corresponding to pre-defined anatomical points, on the digital surface of the intra-oral region of the patient, which can be used as landmarks in the method of certain embodiments of the present invention. The anatomical information required for the algorithm is obtained by digitizing the intra-oral region, typically providing a digitized surface mesh of said intra-oral region of the patient. Commonly a surface scan of a dental cast is acquired, although other techniques exist (e.g. intra-oral scanners). This results in a surface of the intra-oral region of the patient, which contains the required anatomical information. The resulting information obtained as output of the proposed method, i.e. the estimations, is of interest for the user during the planning of a dental implant based treatment. It might replace the diagnostic teeth setup manually created by a dental technician.

The present disclosure also presents a technique for obtaining a segmentation of intra-oral digital surface scans that separates the various teeth from each other as well as from the gums. The method is based on fitting a template dental arch with individual teeth to the digitized intra-oral surface of the patient. This template dental arch is called a virtual teeth setup. The method is semi-automated as a minimal amount of user interaction is needed. This user input concerns specifying the teeth that need to be segmented by the method. Preferably, the user also needs to indicate some points, typically corresponding to pre-defined anatomical points, on the digital surface of the intra-oral region of the patient, which can be used as landmarks in the method of certain embodiments of the present invention. The anatomical information required for the algorithm is obtained by digitizing the intra-oral region, typically providing a digitized surface mesh of said intra-oral region of the patient. Commonly a surface scan of a dental cast is acquired, although other techniques exist (e.g. intra-oral scanners). This results in a digital surface of the intra-oral region of the patient, which contains the required anatomical information.

The algorithm employs a statistical model that relates the shape and pose of a crown or tooth to its neighbouring crowns or teeth. More in particular, the statistical model describes at least one of a shape of individual teeth of the virtual teeth setup, relations between shapes of neighbouring teeth of the virtual teeth setup and/or relations between positions and/or orientations of neighbouring teeth of the virtual teeth setup. The statistical model has been obtained by observing an extensive dataset of close-to-ideal intra-oral situations. From this dataset relations between the shape and pose of neighbouring crowns or teeth are extracted. The algorithm adapts the virtual teeth setup to the remaining teeth of the patient as specified by the user and estimates the shape and pose of the dental restorations, being given the statistical model. A so called energy function is applied and optimized, which comprises a first measure indicative of a fit between the patient's anatomy, digitized surface mesh of said intra-oral region of the patient, and the virtual teeth setup, and a second measure indicating a probability of the virtual teeth setup given the statistical model. Preferably, the application and optimisation of the energy function is preceded by aligning the digitized surface mesh of said intra-oral region of the patient and the initial virtual teeth setup, preferably using said landmarks on said digitized patient's intra-oral surface and corresponding landmarks on said virtual teeth setup. This is the second step shown in the flow chart of FIG. 1. In addition, a number of driving forces can be included in the energy function to steer the algorithm towards an ideal solution. These driving forces favour symmetry, contact between neighbouring crowns and a number of aesthetic improvements.

Optionally, the output of the algorithm can further be improved by removing possible overlap between neighbouring crowns, by ensuring a correct occlusion between the upper and lower jaw and/or by adapting the shape and pose of a prosthetic crown from an existing library towards the solution. The algorithm may also contain a number of driving forces that steer the solution towards a close-to-optimal prosthethic restoration for one ore more crowns. The user can adapt the algorithm for a specific patient case by attributing weights that reflect the importance of certain driving forces.

The above overview of the proposed method is elaborated in more technical detail below.

The algorithm according to certain embodiments of this invention adopts an approach whereby an energy function is formulated. The flowchart of FIG. 1 shows this essential concept of the proposed algorithm. The energy function value is a measure for the quality or idealness of the virtual teeth setup. Higher energy values correspond to a lower quality or less ideal virtual teeth setup, and, similarly, lower energy values correspond to a higher quality or more ideal virtual teeth setup. For each case, starting from an initial estimate, the virtual teeth setup is evolved towards lower energy values resulting in an ideal solution. The virtual teeth setup itself contains some or all of the existing teeth of the patient, as well as the teeth to be replaced by prosthetic means. The presented approach can be seen as a template (i.e. the virtual teeth setup) that is overlaid onto the existing anatomical situation by the algorithm. Thereby, the dental restorations, e.g. prosthetic teeth, in the setup are designed in such a way to conform to the requirements (i.e. to have a low energy value). The process of evolving a solution towards lower energy values is called optimization. The proposed approach is both generic and flexible, as the energy function can be easily extended or tailored to specific needs.

For a segmentation, the algorithm of certain embodiments of this invention adopts an approach whereby an energy function is formulated, the energy function value being a measure for the quality of the fit between the digital intra-oral surface of the patient and the virtual teeth setup. High energy values correspond to a low quality fit, and, similarly, low energy values correspond to a high quality fit. For each case, starting from an initial estimate, the virtual teeth setup is evolved towards lower energy values resulting in an ideal solution. The virtual teeth setup itself contains the teeth specified by the user. The presented approach can be seen as a template (i.e. the virtual teeth setup) that is overlaid onto the existing anatomical situation by the algorithm. The process of evolving a solution towards lower energy values is called optimization. The proposed approach is both generic and flexible, as the energy function can be easily extended or tailored to specific needs. An overview of the main steps of the proposed algorithm for this case in provided in FIG. 2. In a first step the user needs to indicate a tooth or teeth to be segmented from the digital intra-oral surface of the patient. Next, an energy function is applied given the statistical model describing at least one of a shape of individual teeth of said virtual teeth setup, relations between shapes of neighbouring teeth of said virtual teeth setup and/or relations between position and/or orientation of neighbouring teeth of said virtual teeth setup. Finally, from the energy function, the estimated shape, position and/or orientation of the tooth or teeth of interest can be derived.

An important aspect of the algorithm concerns the formulation of an adequate energy function. As already pointed out, the energy function provides a measure for the quality of the virtual teeth setup with respect to the functional and aesthetic requirements.

Before describing in detail the proposed algorithm, some symbols and definitions used in the detailed explanations below, are presented. A virtual tooth $T=(t,R,M)$, is represented by a translation vector $t \in R^3$, a rotation matrix $R \in SO(3)$ (i.e. the space of rotation matrices) and a shape represented by a polygonal surface mesh $M=(V, \varepsilon, P)$ which consists of an ordered set of points or vertices $V=\{v_i \in R^3\}$, $1 \le i \le |V|$], connected by edges $e \in \varepsilon V \times V$ forming simple polygons $P=[p_1, \ldots p_{|P|}]$ like triangles or quadrilaterals, covering the surface such that $p_i \cap p_j = \emptyset$ for $i \ne j$. The distinction between translation, rotation and shape offers an improved flexibility and adaptability.

A virtual teeth setup is represented by $S=[T_i]_{i=1}^{|D|}$, where $T_i \in \mathbb{T} = \mathbb{R}^3 \times SO(3) \times \mathbb{R}^{3 \times |V|}$ is a virtual tooth and D defines a specific dentition. A dentition is the set of teeth contained in a jaw as prescribed by medical knowledge. Examples are the permanent teeth and the deciduous teeth. Typically, the dentition of permanent teeth is used. This dentition consists of the following left/right symmetric teeth: third molar, second molar, first molar, second premolar, first premolar, canine, lateral incisor, central incisor. The anatomical information, available as a surface mesh, is given by A. This surface mesh again comprises of vertices, edges and polygons.

The energy function provides a measure for the quality of the virtual teeth setup, measured with respect to the functional and aesthetic requirements. For a segmentation, the energy function provides a measure for the quality of the fit between the digital intra-oral surface and the virtual teeth setup. The positioning and shape of teeth over a larger population is observed. Statistical models are perfectly suited for transferring the available information from the population to the specific case at hand, since they capture this information in a comprehensible manner. Moreover, they define a (probability) measure on the idealness of the positioning and shape of the teeth in the virtual teeth setup. The word 'ideal' refers to what is common or natural when observing a large population. As such, a statistical model captures the relations between the teeth in the virtual teeth setup and enforces a plausible position, orientation, and shape on the teeth to be restored by prosthetic means. This results in a generic and objective approach. The statistical model in certain embodiments of this invention focuses on the one hand on the shape of teeth, both individual and in relation to each other, and on the other hand on the pose (position and orientation) of teeth relative with respect to each other.

Energy functions are formulated through a probabilistic approach. The conditional probability for the virtual teeth setup S given the available anatomical information of a patient A, the shape model $\theta$ and the pose model $\phi$ is given by $p(S|A, \theta, \phi)$. Using Bayesian calculus this can be expressed as $$p(S | \mathcal{A}, \Theta, \Phi) = \frac{p(S, \mathcal{A}, \Theta, \Phi)}{p(\mathcal{A}, \Theta, \Phi)} \quad (1)$$

$$= \frac{p(\mathcal{A} | S, \Theta, \Phi) p(S | \Theta, \Phi)}{p(\mathcal{A})}$$

$$= \frac{p(\mathcal{A} | S) p(S | \Theta, \Phi)}{p(\mathcal{A})},$$

where $p(A|S)$ is the data likelihood and $p(S|\theta, \phi)$ the model prior. The virtual ideal teeth setup is obtained by maximizing this probability with respect to the virtual teeth setup S. Since the term $p(A)$ in the denominator is a constant, it is of no importance for maximizing the probability. Instead of directly maximizing this probability, its negative logarithm is minimized as $$S^* = \underset{S}{\mathrm{argmin}}(-\log(p(\mathcal{A} | S)) - \log(p(S | \Theta, \Phi))) \quad (2)$$

As such the energy function can be expressed as $$E(S; \mathcal{A}, \theta, \Phi) = E_{DL}(\mathcal{A}; S) + E_{MP}(S; \theta, \Phi) \quad (3)$$

where $E_{DL}$ (A; S) corresponds to the data likelihood term and $E_{MP}(S; \theta, \phi)$ corresponds to the model prior term.

The energy function from equation 3 can optionally be complemented with other energy terms. In principle these energy terms can as well be encoded in the probability framework. However, these terms are mostly added based on experimental results in order to further refine the results. As such, these terms are rather heuristic in nature. Therefore, encoding them in the probability framework is merely artificial. As such, the complete energy function can be formulated as $$E(S; \mathcal{A}, \theta, \Phi) = E_{DL}(\mathcal{A}; S) + E_{MP}(S; \theta, \Phi) + E_{ADD}(S) \quad (3)$$

where the additional energy terms are grouped in the $E_{ADD}$ (S) term. All terms are detailed further in this description.

The data likelihood term measures the likelihood of observing the given anatomical information A given a virtual teeth setup S. As such, it is a measure for the goodness fit between the anatomy of the patient and the virtual teeth setup. As stated before the anatomical information of the patient is available as a surface mesh. The corresponding energy term $E_{DL}$ (A;S) is defined as two separate terms, a surface term $E_S$ (A;S) and a landmarks term $E_L$ (A;S). The landmarks term is primarily focused on a good initialization and requires a set of landmarks to be indicated on the anatomical surface mesh. Corresponding landmarks should be indicated on the virtual teeth setup. The surface term on the other hand forces the solution towards a perfect fit between the virtual teeth setup and the patient's anatomy.

Figure 3:
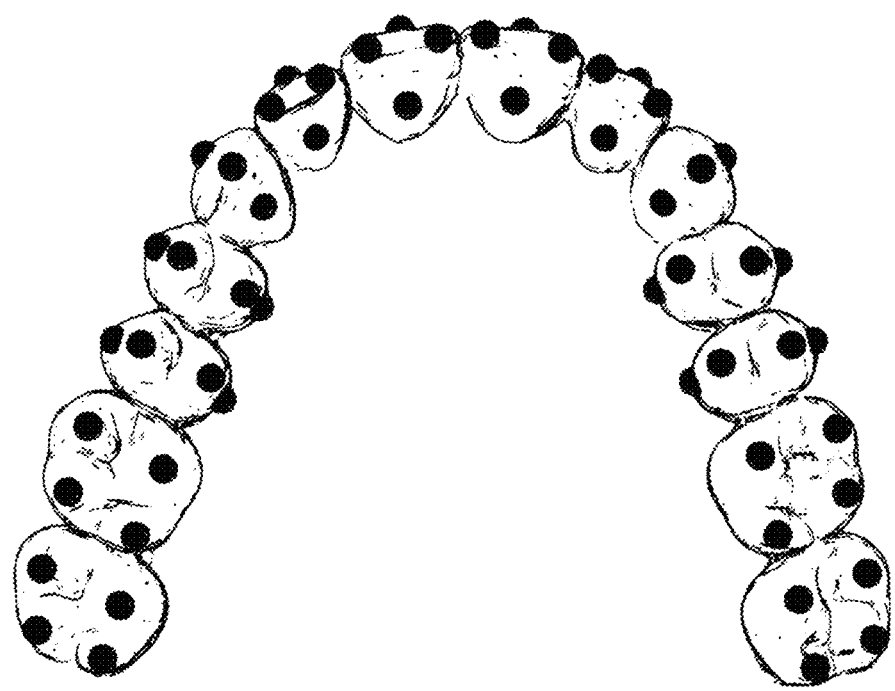
FIG. 3 illustrates landmarks defined on the teeth.

The landmarks term provides a measure for the distance between the anatomy of the patient and the virtual teeth setup based on a set of corresponding landmarks indicated on both. The set of landmarks indicated on the anatomy of the patient and the virtual teeth setup is given by, respectively $L_A=[l_i^A \in R^3]$ with i=1, . . . , N and $L_S=[l_i^S \in R^3]$ with i=1, . . . , N, where N is the number of landmarks. The landmark points $l_i^S$ are given by $$l_i^S = R_T v_i^* + t_T \quad (5)$$

where T is the respective tooth with pose defined by $R_T$ and $t_T$, and $v_i^* \in V_T$ is the landmark point on the tooth surface. FIG. 3 illustrates the defined landmarks. The landmark based distance is given by $$E_L(\mathcal{A}; S) = \sum_{i=1}^{N} d^2(l_i^A, l_i^S) \quad (6)$$
$$= \sum_{i=1}^{N} (l_i^A - l_i^S)^T (l_i^A - l_i^S)$$
$$= \sum_{i=1}^{N} (l_i^A - R_T v_i^* - t_T)^T (l_i^A - R_T v_i^* - t_T)$$

Figure 4:
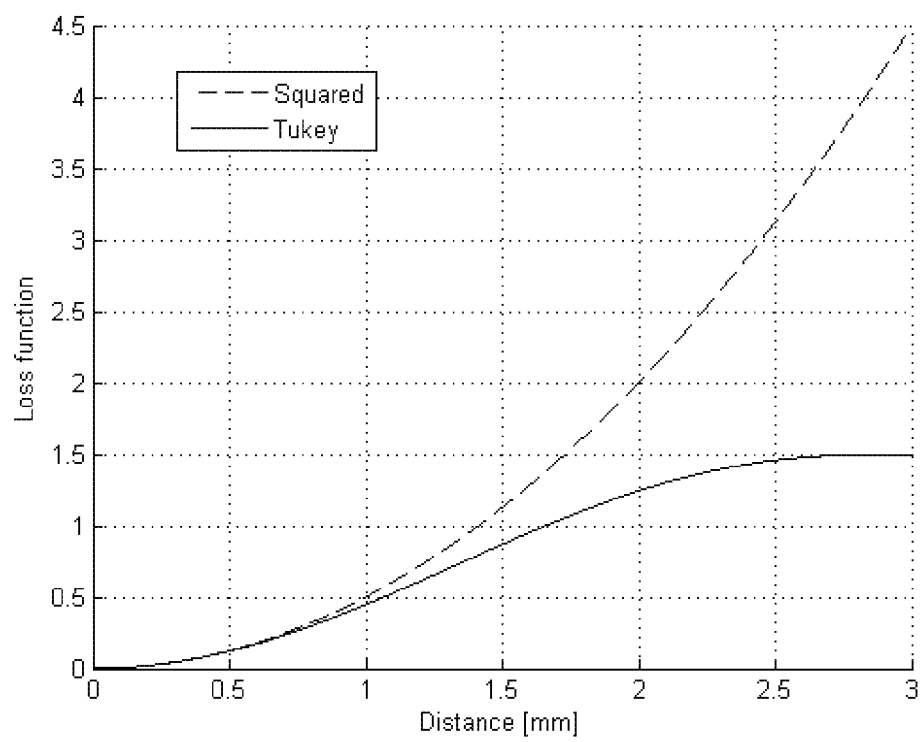
FIG. 4 illustrates the Tukey robust loss function, which is advantageously used in the surface term.

The surface term measures for each point of the virtual teeth setup the distance to the anatomical surface mesh. If the fit between the anatomy of the patient and the virtual teeth setup is close to perfect, this distance should be very small. The basic surface term is given by $$E_S(A; S) = \sum_{|D_A|} \sum_{i=1}^{|V_T|} d^2(A, R_T v_i + t_T)$$

where $D_A$ is the set of existing teeth for which anatomical information is available, $V_T$ is the set of vertices for tooth T, $R_T$ the rotation matrix of tooth T and $t_T$ the translation vector of tooth T. The function d(A,x) measures the distance between the surface mesh A and the point x. Unfortunately, three major problems arise with this approach. First, at the level of the interstices no information is available. In the virtual teeth setup, however, this information is present. Measuring the distance at these points is therefore not correct. Second, the anatomical surface mesh contains both the teeth and the gums. Since the gum covers the teeth up to a certain level and is not present in the virtual teeth setup problems arise here as well. Third, artefacts might be present in the anatomical surface mesh resulting from the digitization technique. A possible solution would be to detect the points where these problems occur and remove them from the expression. Another approach is to consider these problems as outliers and to reduce the sensitivity of the surface term to these outliers. An established technique to reduce the sensitivity to outliers employs robust m-estimators. Robust m-estimators replace the squared loss function with a more robust function, less sensitive to outliers. As such, the surface term is given by $$E_S(\mathcal{A}; S) = \sum_{|D_{\mathcal{A}}|} \sum_{i=1}^{|V_T|} \rho(d(\mathcal{A}, R_T v_i + t_T)) \quad (7)$$

where ρ is the robust loss function. Various robust loss functions exist. One option is to use the Tukey estimator which is given by $$\rho(x) = \begin{cases} \frac{c^2}{6}\left(1 - \left(1 - \left(\frac{x}{c}\right)^2\right)^3\right) & \text{if } |x| \le c \\ \frac{c^2}{6} & \text{if } |x| > c \end{cases} \quad (8)$$

where c is a problem specific constant. The Tukey loss function is illustrated in FIG. 4. As can be seen from FIG. 4, for small values of x, the Tukey loss function closely follows the squared loss function. For increasing values of x the Tukey loss function increases slower and levels off to a constant value for values of x greater than c. As such, outliers have a reduced influence on the value of the surface term, leading to an energy term robust to outliers.

Figure 5:
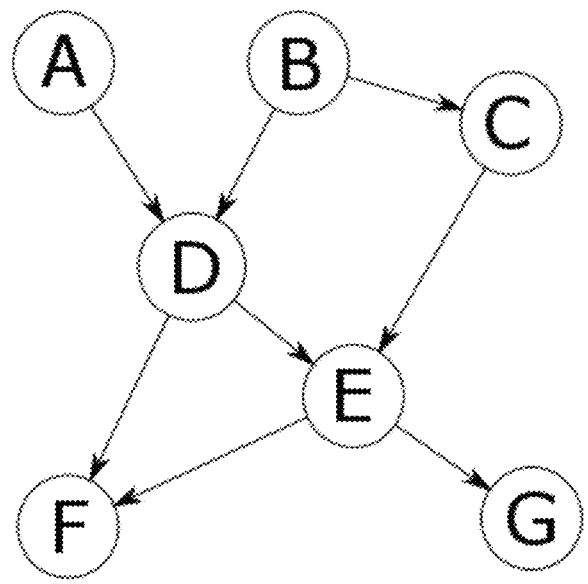
FIG. 5 illustrates a graphical model as used in the model prior term.
Figure 6:
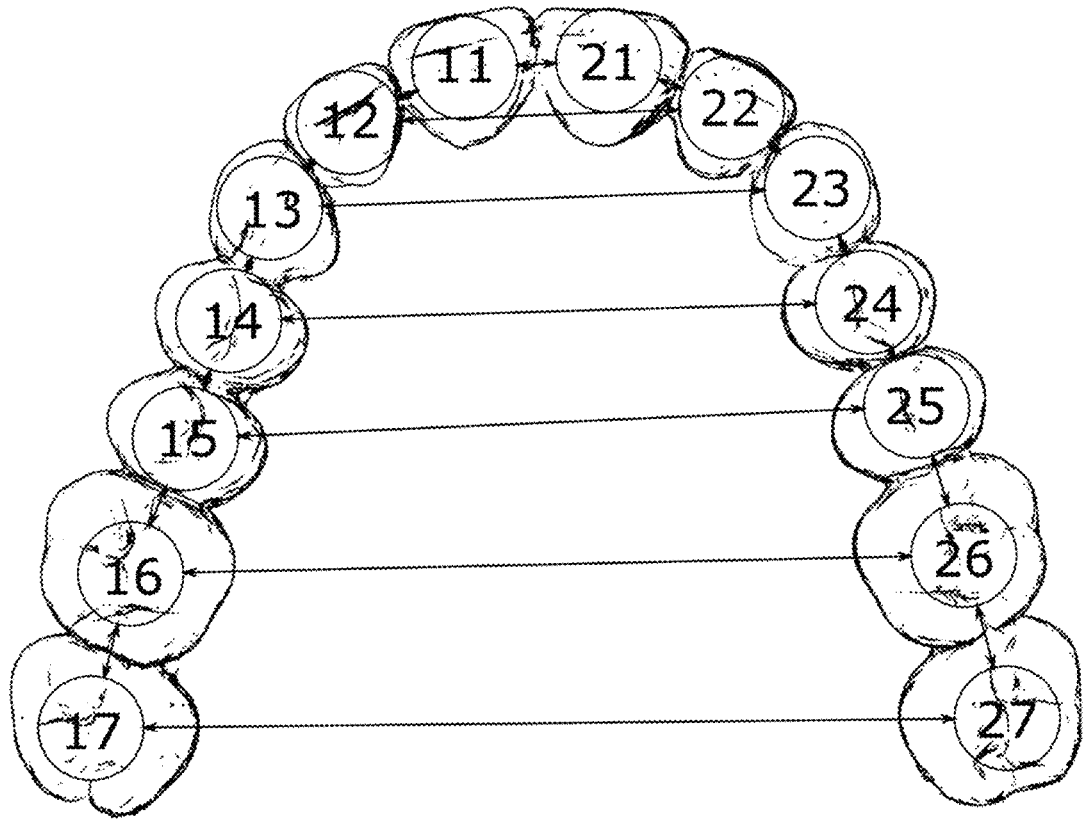
FIG. 6 illustrates a specific graphical model where the nodes correspond to the different teeth the edges are bidirectional

The model prior term gives the probability for the virtual teeth setup S given models θ and φ. The statistical model θ describes the shape of individual teeth, as well as the pairwise relations between shapes of neighbouring teeth. This type of model can be referred to as a graphical model. Graphical models are typically represented by a graph G consisting of a set of nodes N and a set of edges E connecting the nodes. Both the nodes and the edges contain statistical models. FIG. 5 provides an illustration. For this specific case, the nodes correspond to the teeth in the virtual teeth setup and the associated models describe the shape of the respective teeth. The models associated with the edges describe the relations between the shapes of the teeth connected by the respective edges, as illustrated in FIG. 6. The statistical pose model φ describes the relations between the poses of neighbouring teeth. Therefore, it can as well be represented by graphical model. However, in this case only the edges contain statistical models. The statistical model associated with each edge describes the relation between the poses of the teeth connected by the respective edge. As such, the statistical shape and pose models can be given by $$\Theta = \mathcal{G}_\Theta(\{\theta_T\}, \{\theta_{TT}\}) \quad (9)$$

$$\Phi = \mathcal{G}_\Phi(\{\phi_{TT}\}) \quad (10)$$

where $G_\theta$ is the graph structure for the shape model, $\{\theta_T\}$ is the set of all individual shape models, $\{\theta_{TT}\}$ is the set of all posterior shape models, $G_\phi$ is the graph structure for the pose model and $\{\phi_{TT}\}$ is the set of all posterior pose models.

The different statistical submodels describing a virtual teeth setup can be split in three categories: statistical models describing a single shape, statistical models describing the relation between two shapes, and statistical models describing the relation between two poses. Since the three categories need to be evaluated differently, the model prior energy term is split in three parts. Each of these terms is explained below.

The shape model term contains the contributions of all statistical shape models in θ. These statistical models describe the shape of a single tooth. A standard Principal Component Analysis (PCA) shape model is used. PCA computes a set of orthonormal directions (principal components) that describe the largest modes of variation present in the training data set. It is a linear technique, hence all permissible shapes are given by a mean shape and a linear combination of the principal components. Since performing PCA requires computing the mean and covariance matrix from the training data set it imposes a Gaussian distribution. The conditional distribution $p(S|\{\theta_T\})$ is given by $$p(S|\{\theta_T\}) = \prod_{T \in S} p(T|\theta_T) \quad (11)$$

$$= \prod_{T \in S} p(M_T|\theta_T)$$

$$\propto \prod_{T \in S} \exp\left(-\frac{(x_T - \bar{x}_T)\sum_T^{-1}(x_T - \bar{x}_T)}{2}\right)$$

where T is a tooth of the virtual teeth setup S, $\theta_T$ the model describing the shape of tooth T, $M_T$ the shape of tooth T, $x_T$ the vector representation of this shape, $\bar{x}_T$ the average shape and $\Sigma_T$ the covariance matrix. The associated enemy function term is given by $$E_{MP}(S|\{\theta_T\}) = \sum_{T \in S} \frac{1}{2}(x_T - \bar{x}_T)\sum_T^{-1}(x_T - \bar{x}_T) \quad (12)$$

Next, the posterior shape model term comprises of the contributions of all posterior statistical shape models in θ. These statistical models describe the relationship between the shapes of two neighbouring teeth. To design the posterior shape model the approach adopted in "Posterior Shape Models" (Albrecht et al., Medical Image Analysis, 17(8), pp. 959-973, 2013) can be used. This posterior shape model consists of a conditional Gaussian distribution on a first shape (response) given a second shape (predictor). This type of model is closely related to the standard PCA-based shape models. The resulting conditional distribution $p(S|\{\theta_{TT}\})$ is given by $$p(S|\{\theta_{TT}\}) = \prod_{(P,R) \in \mathcal{E}_\Theta} p(R, P | \theta_{PR}) \quad (13)$$

$$= \prod_{(P,R) \in \mathcal{E}_\Theta} p(M_R, M_P | \theta_{PR})$$

$$\propto \prod_{(P,R) \in \mathcal{E}_\Theta} p_{\theta_{PR}}(x_R | x_P),$$

where $\varepsilon_\theta$ is the set of all edges in θ, P and R denote two teeth connected by an edge and $\theta_{PR}$ is the associated model. The probability for each edge is given by $$p_{\theta_{PR}}(x_R|x_P) = N(\bar{x}_R + Q_R M^{-1} Q_P^T (x_P - \bar{x}_P), \sigma^2 (Q_R M^{-1} Q_R^T)).$$

For further details on this expression reference is made to the paper of Albrecht et al. The associated energy function term is given by $$E_{MP}(S|\{\theta_{TT}\}) = -\sum_{(P,R) \in \mathcal{E}_\Theta} \log(p_{\theta_{PR}}(x_R | x_P)) \quad (14)$$

Finally, the posterior pose model term contains the contributions of all posterior statistical pose models in φ. These submodels of the statistical model applied in certain embodiments of the invention describe the relation between the poses of two neighbouring teeth. The pose of a tooth comprises a rotation matrix $R \in SO(3)$ and translation vector $t \in R^3$. Therefore, pose can be represented by a rigid transformation matrix $T \in SE(3)$ (i.e. the space of rigid transformations) as $$T = \begin{bmatrix} R & t \\ 0 & 1 \end{bmatrix} \quad (15)$$

A posterior pose model gives an estimate on the pose of a first tooth, given the pose of a second neighbouring tooth connected by an edge. This estimate comprises a Gaussian probability distribution. As such, the posterior pose models are closely related to the posterior shape models. The resulting conditional distribution $p(S|\{\phi_{TT}\})$ is given by $$p(S|\{\phi_{TT}\}) = \prod_{(P,R) \in \mathcal{E}_\phi} p(R, P | \phi_{PR}) \quad (16)$$

$$= \prod_{(P,R) \in \mathcal{E}_\phi} p(T_R, T_P | \phi_{PR})$$

$$\propto \prod_{(P,R) \in \mathcal{E}_\phi} p_{\phi_{PR}}(T_R | T_P).$$

where $T_P$ and $T_R$ are the transformation matrices for tooth P and R, respectively. The expression for the probability for each edge is very similar to the posterior shape model case. The associated energy function is given by $$E_{MP}(S|\{\phi_{TT}\}) = -\sum_{(P,R) \in \mathcal{E}_\phi} \log(p_{\phi_{PR}}(T_R | T_P)) \quad (17)$$

Now the additional energy function terms are presented. These terms can be added to further refine and improve the outcome of the algorithm based on experiments. Depending on the specific case at hand, it might be better to enable or disable some of these additional terms. For each of these terms the rationale is explained more into detail below.

Figure 7:
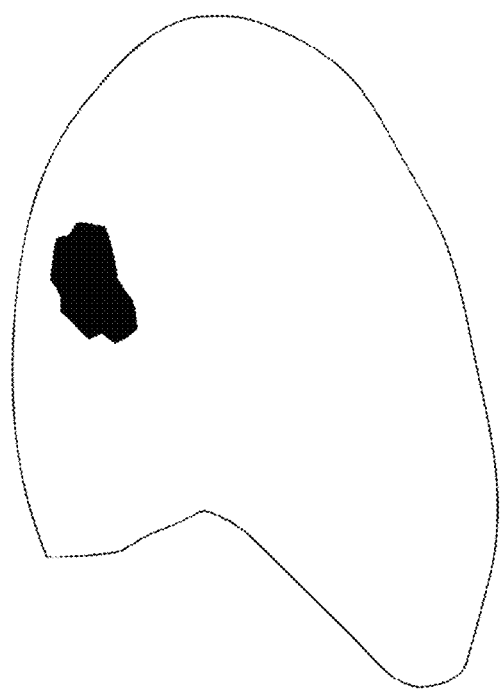
FIG. 7 illustrates a set of contact points, used in a contact point term in the energy function.

In some cases neighbouring prosthetic crowns don't make contact with each other. This results in an unnaturally looking ideal teeth setup as gaps exist between the different teeth. The contact point term tries to remedy this shortcoming. For each tooth two sets of contact points are determined (for the most posterior ones only one set), a mesial oriented set and a distal oriented set. For two neighbouring teeth the distal contact point set of the mesial tooth should make contact with the mesial contact point set of the distal tooth. The contact point term provides a measure for the distance between related contact point sets. As a side effect, this term also prevents neighbouring teeth from overlapping with each other. An example of a set of contact points is illustrated in FIG. 7. The contact point structure can be stored in a graph $G_{CP}$ that consists of a set of nodes $N_{CP}$, corresponding to the teeth, and a set of directed edges $E_{CP}$. The edges are defined between neighbouring teeth in the mesial and distal direction. Each directed edge contains a set of contact points. What remains to be defined, is the measure for the distance between two sets of contact points. The measure should be low when this distance is small and the points of both sets are in contact with each other. On the other hand, the measure should be high when the points of both sets are located far from each other. Various measures can be devised. One example is the negative Kernel Correlation (KC) measure. The kernel correlation measure originates from an approximation to the L2 norm of probabilistic Kernel Density Estimation (KDE) representations. The KDE representation of a set of points $P=\{x_i \in R^3\}$, $i=1 \ldots N$, with Gaussian kernels is given by $$pp(x) = \frac{(\pi\sigma^2)^{-\frac{3}{2}}}{N} \sum_{i=1}^{N} \exp\left(-\frac{\|x-x_i\|^2}{\sigma^2}\right) \tag{18}$$

As such, it assigns a probability to each point $x \in R^3$ for that point to belong to the set of points. The squared L2 norm of the KDE representation for two sets of points P and Q is given by $$d_{L2}^2(pp(x), p_Q(x)) = \int_{R^3} (pp(x) - p_Q(x))^2 dx \tag{19}$$

$$= \int_{R^3} p_P^2(x) dx + \int_{R^3} p_Q^2(x) dx - 2\int_{R^3} pp(x) p_Q(x) dx$$

The latter term $\int_{R^3} p_P(x) p_Q(x) dx$ is the kernel correlation term. When minimizing the L2 norm by seeking a rigid alignment between both sets of points P and Q, the kernel correlation is the only relevant term. The former terms $\int_{R^3} p_P(x) dx$ and $\int_{R^3} p_Q^2(x) dx$ are constant in this case. For the purpose of aligning two sets of contact points, the deformations are not rigid, so the approximation is not valid. Nevertheless, the negative kernel correlation term gives a valid measure for the distance between both sets of points. The kernel correlation term can be further expressed as $$KC(\mathcal{P}, \mathcal{Q}) = \int_{R^3} pp(x) p_Q(x) dx$$

$$= \frac{(\pi\sigma^2)^{-3}}{N_P N_Q} \int_{R^3} \sum_{i=1}^{N_P} \exp\left(-\frac{\|x-x_i\|^2}{\sigma^2}\right) \sum_{j=1}^{N_Q} \exp\left(-\frac{\|x-x_j\|^2}{\sigma^2}\right) dx$$

$$= \frac{(\pi\sigma^2)^{-3}}{N_P N_Q} \sum_{i=1}^{N_P} \sum_{j=1}^{N_Q} \int_{R^3} \exp\left(-\frac{\|x-x_i\|^2}{\sigma^2}\right) \exp\left(-\frac{\|x-x_j\|^2}{\sigma^2}\right) dx$$

$$= \frac{(2\pi\sigma^2)^{-\frac{3}{2}}}{N_P N_Q} \sum_{i=1}^{N_P} \sum_{j=1}^{N_Q} \exp\left(-\frac{\|x_i-x_j\|^2}{2\sigma^2}\right).$$

Using the kernel correlation the contact point energy term can be expressed as $$E_{CP}(S) = -\sum_{\substack{(M,D) \in \mathcal{E}_{CP} \\ (D,M) \in \mathcal{E}_{CP}}} KC(\mathcal{P}_{MD}^G, \mathcal{P}_{DM}^G) \tag{21}$$

where M and D are two neighbouring teeth connected by two directed edges, and $P^G_{MD}$ and $P^G_{DM}$ are given by $$\mathcal{P}_{MD}^G = \{x_i \in \mathbb{R}^3 | x_i = R_M v_i + t_M, v_i \in \mathcal{P}_{MD} \subset \mathcal{V}_M\},$$

$$\mathcal{P}_{MD}^G = \{x_i \in \mathbb{R}^3 | x_i = R_D v_i + t_D, v_i \in \mathcal{P}_{DM} \subset \mathcal{V}_D\},$$

where $P_{MD}$ is the set of contact points associated with the directed edge (M,D), $P_{DM}$ the set of contact points associated with the inverse directed edge (D,M), and $V_M$ and $V_D$ the sets of points of teeth M and V, respectively.

A requirement of utmost importance from an aesthetic point of view is symmetry. Since a distinction is made between pose and shape, symmetry can be defined for both. Below, first an energy function term is presented that measures the symmetry between the pose of two contralateral teeth and next an energy function term for shape symmetry.

A first requirement is to estimate the anatomical planar symmetry transformation of the patient. A number of possible solutions exist to estimate this transformation. The most straightforward solution is based on two sets of corresponding points indicated on the anatomical surface mesh. A planar symmetry transformation matrix TG can be computed based on the corresponding point sets. This transformation matrix can be decomposed as $$T = \begin{bmatrix} H & t \\ 0 & 1 \end{bmatrix} \tag{22}$$

where H is a Householder transformation matrix and t is a translation vector.

A second requirement is to estimate the local planar symmetry transformation for each tooth individually. Assuming corresponding points exist between contralateral teeth, a mirrored rigid transformation can be computed by (20)

enforcing the determinant of the rotation component to be equal to −1. The resulting mirrored rigid transformation matrix T' can be decomposed as $$T' = \begin{bmatrix} H' & t' \\ 0 & 1 \end{bmatrix} \quad (23)$$

where H' is the combination of a rotation and mirroring operation and t' is a translational component.

Figure 8:
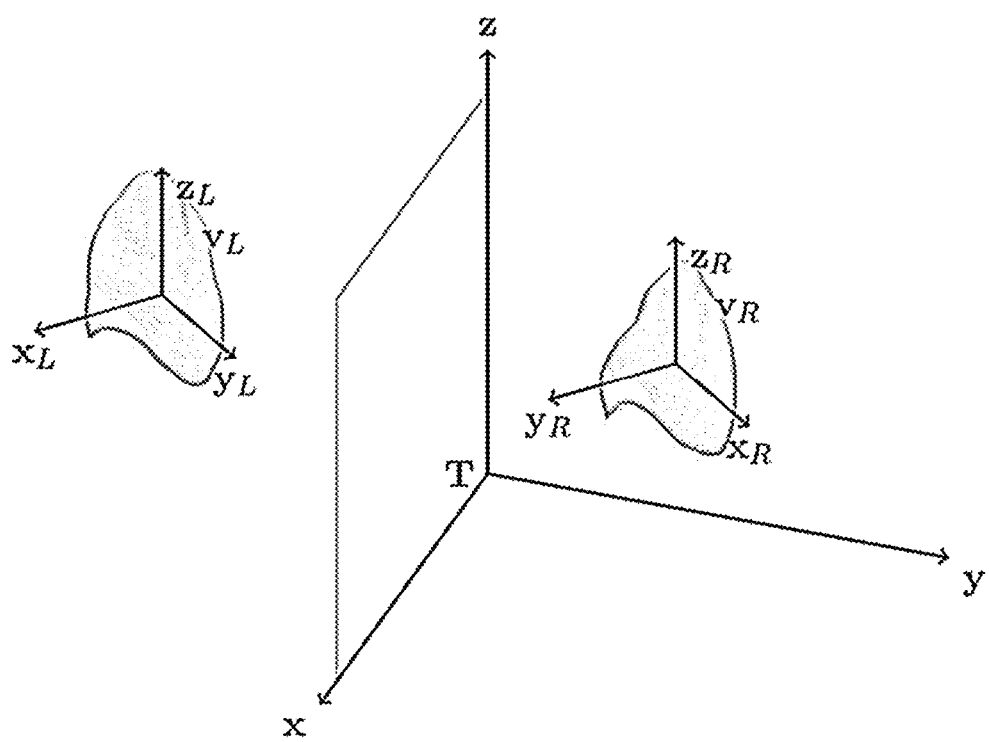
FIG. 8 illustrates the pose symmetry term.

In order to clarify the following derivation of the pose symmetry energy function term an illustration of a specific situation is shown in FIG. 8. This figure shows the left and right canine with the corresponding local coordinate systems $(x_L, y_L, z_L)$ and $(x_R, y_R, z_R)$, a global coordinate system $(x,y,z)$, and the mirroring plane defined by T. The transformation T' is not shown, but maps a point $v_R$ from the right canine onto the corresponding point $v_L$ of the left canine $$v_L = H' v_R + t' \quad (24)$$

The inverse transformation is given by $$v_R = H'^T v_L - H'^T t' \quad (25)$$

The transformation of a point $v_L$ from the local coordinate system $(x_L, y_L, z_L)$ to the global coordinate system $(x,y,z)$ is given by $$x_L = R_L v_L + t_L \quad (26)$$

where $R_L$ and $t_L$ define the pose of the left tooth. Similarly, the transformation of a point $v_R$ from the local coordinate system $(x_R, y_R, z_R)$ to the global coordinate system $(x,y,z)$ is given by $$x_R = R_R v_R + t_R \quad (27)$$

where $R_R$ and $t_R$ define the pose of the right tooth. The planar symmetry transform T maps corresponding points $x_L$ and $x_R$ onto each other $$x_L = H x_R + t \quad (28)$$

$$x_R = H x_L + t \quad (29)$$

Combining expressions 26, 27, 28 and 29 gives the following two expressions $$R_L v_L + t_L = H R_R v_R + H t_R + t \quad (30)$$

$$R_R v_R + t_R = H R_L v_L + H t_L + t \quad (31)$$

The objective is to derive an expression for $R_L$ and $t_L$ given $R_R$ and $t_R$, and similarly to derive an expression for $R_R$ and $t_R$ given $R_L$ and $t_L$. This is possible by combining both expressions above with expressions 24 and 25

$$R_L v_L + t_L = H R_R H'^T v_L - H R_R H'^T t' + H t_R + t \quad (32)$$

$$R_R v_R + t_R = H R_L H' v_R + H R_L t' + H t_L + t \quad (33)$$

As such, the pose of the left tooth can be expressed in terms of the pose of the right tooth given T and T' as $$R_L^* = H R_R H'^T \quad (34)$$

$$t_L^* = H t_R + t - R_L^* t' \quad (35)$$

Similarly, the pose of the right tooth can be expressed in terms of the pose of the left tooth as $$R_R^* = H R_L H'^T \quad (36)$$

$$t_R^* = H t_L + t + H R_L t' \quad (37)$$

Both expressions define a relation between the poses of the left and right tooth. If the pose of the left and right tooth is perfectly symmetric with respect to T and T', the following relations would hold $$R_L = R_L^*,$$

$$t_L = t_L,$$

$$R_R = R_R^*,$$

$$t_R = t_R.$$

Based on this a measure for the symmetry between the poses of the left and right tooth can be formulated as the distance between the true poses $(R_L, t_L)$ and $(R_R, t_R)$ to the predicted poses $(R_L^*, t_L^*)$ and $(R_R^*, t_R^*)$. Measuring the distance between rigid transformation matrices needs to take into account the underlying manifold structure of the Lie group SE(3). The distance can be measured in the corresponding Lie algebra se(3) as $$d(T_1, T_2) = \|\log(T_1^{-1} T_2)\| \quad (38)$$

where log is the logarithmic map. As such, the symmetric pose term is given by $$E_{SP}(S) = \frac{1}{2} \sum_{(\mathcal{L,R})\in \mathcal{X}} d^2(T_\mathcal{L}, T_\mathcal{L}^*) + d^2(T_\mathcal{R}, T_\mathcal{R}^*) \quad (39)$$

where X is the set of all left-right teeth pairs present in S, $$T_\mathcal{L}^* = \begin{bmatrix} R_\mathcal{L}^* & t_\mathcal{L}^* \\ 0 & 1 \end{bmatrix} \quad (40)$$

$$T_\mathcal{R}^* = \begin{bmatrix} R_\mathcal{R}^* & t_\mathcal{R}^* \\ 0 & 1 \end{bmatrix} \quad (41)$$

and

Now an energy function term favouring symmetrical shapes is presented. Given the mirrored rigid transformation T' defined for each left-right pair of teeth, this energy function term can be given by $$E_{SS}(S) = \sum_{(\mathcal{L,R})\in \mathcal{X}} d^2(v_\mathcal{L}, H'_{(\mathcal{L,R})} v_\mathcal{R} + t'_{(\mathcal{L,R})}) \quad (42)$$

$$= \sum_{(\mathcal{L,R})\in \mathcal{X}} \sum_i (v_i^\mathcal{L} - H'_{(\mathcal{L,R})} v_i^\mathcal{R} - t'_{(\mathcal{L,R})})^T (v_i^\mathcal{L} - H'_{(\mathcal{L,R})} v_i^\mathcal{R} - t'_{(\mathcal{L,R})})$$

where $v_i^L \in V_L$, and $v_i^L \in V_R$.

To further refine the solution for the anterior teeth a set of heuristic rules based on predefined points or landmarks on the teeth can be added. These heuristic rules constrain the relative positioning of the landmarks with respect to each other. The set of heuristic rules currently used can be split into two categories. The first category comprises heuristic rules that define a relation on the positions of the landmarks and the second category heuristic rules that define a relation on the distances between landmarks. An example of the former is a heuristic rule that imposes equal heights on two or more landmarks, defined in the superior-inferior direction. An example of the latter is a heuristic rule imposing equal distance between two or more pairs of landmarks. The set of heuristic rules of the first category is given by Table 1. The set of heuristic rules of the second category is given by Table 2.

TABLE 1

| Heuristic rule | Landmarks involved |
| --- | --- |
| The incisal edge of the left and right central incisor should be at the same height | incisal edge left central incisor, incisal edge right central incisor |
| The incisal edge of the left and right lateral incisor should be at the same height | incisal edge left lateral incisor, incisal edge right lateral incisor |
| The cusp of the left and right canine should be at the same height | Cusp left canine, cusp right canine |

TABLE 2

| Heuristic rule | Landmarks involved |
| --- | --- |
| The width of the left and right central incisor in a frontal view should be equal | left central incisor medial and lateral, right central incisor medial and lateral |
| The width of the left and right lateral incisor in a frontal view should be equal | left central incisor lateral, left lateral incisor lateral, right central incisor lateral, right lateral incisor lateral |
| The width of the left and right canine in a frontal view should be equal | left lateral incisor lateral, left canine lateral, right lateral incisor lateral, right canine lateral |

A prerequisite for these heuristic rules to be valid is a correct positioning of the virtual teeth setup. The z-axis should be perpendicular to the occlusal plane and point in the inferior direction for the upper jaw. The y-axis should be perpendicular to the coronal plane and point in the ventral direction. From these, the x-axis is parallel to the mediolateral axis and points from the patient's right to left.

The energy function term for the first heuristic rule of table 1 can be formulated as $$E_{HR}(S) = (R_{11}v_{IE}^{11} + t_{11} - c_{11})^T W(R_{11}v_{IE}^{11} + t_{11} - c_{11}) + \quad (43)$$
$$(R_{21}v_{IE}^{21} + t_{21} - c_{21})^T W(R_{21}v_{IE}^{21} + t_{21} - c_{21}),$$

where $R_{11}$ and $t_{11}$ define the pose for the right central incisor, $R_{21}$ and $t_{21}$ define the pose for the left central incisor, $v^{11}{}_{IE} \in V_{11}$ is the landmark defined on the incisal edge of the right central incisor, $v^{21}{}_{IE} \in V_{21}$ is the landmark defined on the incisal edge of the left central incisor, W a diagonal matrix containing weights that define the relevant direction and $c_{11} \in R^3$ and $c_{21} \in R^r$ the ideal positions according to the rule. In this case the diagonal matrix W is given by diag(0, 0,1). For the other heuristic rules in Table 1 a similar expression can be derived. The energy function term for the first heuristic rule of Table 2 can be formulated as $$E_{HR}(S) = \left(d_{21} - \sqrt{(v_L^{11} - v_M^{11})^T R_{11}^T W R_{11}(v_L^{11} - v_M^{11})}\right)^2 + \quad (44)$$
$$\left(d_{11} - \sqrt{(v_L^{21} - v_M^{21})^T R_{21}^T W R_{21}(v_L^{21} - v_M^{21})}\right)^2,$$

where $d_{21}$ and $d_{11}$ are the width of respectively the left and right central incisor, $v^{11}{}_L \in V_{11}$ is the lateral landmark of the right central incisor, $v^{11}{}_M \in V_{11}$ is the medial landmark of the right central incisor, $v^{21}{}_L \in V_{21}$ is the lateral landmark of the left central incisor, $v^{21}{}_M \in V_{21}$ is the medial landmark of the left central incisor, and W is diagonal matrix containing the weights that define the relevant direction. In this case the matrix W is given by diag(1,0,0). For the other heuristic rules in Table 2 a similar expression can be derived.

An important requirement for the algorithm is to inhibit the penetration of a tooth by its neighbouring teeth. The need for this requirement is obvious, as a solution where neighbouring teeth overlap with each other is physically not possible. An energy function term penalizing the overlap of teeth with the antagonist surface is included. In a post-processing step occlusion can be taken into account. However, if there is a strong overlap between a tooth and its antagonists, the post-processing step fails to generate a good solution. Therefore, the antagonist overlap energy function term mitigates a possible overlap and, as such, ensures a correct solution from the post-processing step. A prerequisite for this energy function term is the availability of a surface mesh of the opposing jaw containing the antagonists in a correct occlusal relationship.

The antagonist overlap energy function term can be given by $$E_O(S) = \sum_{T \in S} \sum_{i=1}^{|V_T|} d^2(\mathcal{B}, R_T v_i + t_T) H(-d(\mathcal{B}, R_T v_i + t_T)) \quad (45)$$

where B is the surface mesh of the opposing jaw, $R_T$ and $t_T$ define the pose of tooth T, $v_i \in V_T$, $d(B, \bullet)$ is the signed distance to the surface mesh B, and $H:R \to \{0,1\}$ is the Heaviside step function given by $$H(x) = \begin{cases} 0 & \text{if } x < 0 \\ 1 & \text{if } x > 0 \end{cases} \quad (46)$$

The overlap energy function term proposed above poses some problems. First, for the optimization algorithm the gradient of the energy function term should be computed. However, computing the derivative of the Heaviside step function is the Dirac delta function. Second, the Heaviside step function causes the value of the overlap energy function term to be zero whenever there is no overlap, and the value is greater than zero whenever overlap occurs. As such, the overlap energy function term is not smooth in the vicinity of the overlap point, where a kink exists (the derivative is not continuous). This poses problems for the optimization algorithm. A well-known solution is to replace the standard Heaviside step function with a regularized version. A commonly used regularized Heaviside step function is given by $$H_\epsilon(x) = \frac{1}{2}\left(1 + \frac{2}{\pi}\arctan\left(\frac{x}{\epsilon}\right)\right) \quad (47)$$

where ε controls the smoothness. This function approximates the standard Heaviside step function, but is continuous everywhere. FIG. 9 illustrates this function. The regularized antagonist overlap energy function term is given by $$E_O(S) = \sum_{T \in S} \sum_{i=1}^{|V_T|} d^2(\mathcal{B}, R_T v_i + t_T) H_\epsilon(-d(\mathcal{B}, R_T v_i + t_T)) \quad (48)$$

If a diagnostic teeth setup created by a dental technician is available as a surface mesh, this information can be used as well by the algorithm. In this case the surface term can be used to ensure that the relevant teeth will be fitted towards the diagnostic teeth setup. Thereby, the solution of the algorithm is steered towards the diagnostic teeth setup created by a dental technician.

As most machine learning algorithms, the algorithm of certain embodiments of this invention comprises two phases, a training phase and a testing phase. From a user perspective, the testing phase is most of interest as useful output is generated. On the other hand, during the training phase the algorithm gains the necessary knowledge to generate output during the testing phase. The training phase makes use of an elaborate set of exemplar data, commonly referred to as training data. A well-established technique to extract the necessary knowledge from the training data set employs statistical models. In this case the training data set contains surface scanned plaster models. The knowledge extracted from this training data set mostly concerns the pose and shape of the teeth. The output generated during the testing phase is a virtual ideal teeth setup.

So far only the testing phase has been discussed. Now the training phase will be presented. During the training phase the statistical models are constructed, landmarks are defined, sets of contact points are computed, etc. Below the training data set and processing thereof is first detailed. Next, the procedures for aligning the processed training data in a common reference frame are presented. Subsequently, based on the aligned training data, statistical models describing shape and pose are constructed. After that, the symmetry transformations and sets of contact points are computed. Finally, landmarks are defined for each tooth.

The training data set is composed of surface scanned dental casts. Separate training data sets are used for the upper and lower jaw, as different models are constructed for both. However, the procedures discussed here apply to both. All dental casts are laser scanned, resulting in a detailed surface mesh of the dental cast containing the teeth and the gums. On these surface meshes anatomical landmarks are manually indicated. The number of training samples can be doubled by mirroring each training sample using the left/right mirroring plane. This plane can be estimated from the manually indicated landmarks. As such, the resulting training data set contains each training sample twice, once as the original sample and once as its mirrored version. A direct benefit from this approach is that it improves the symmetry in the computed statistical models.

The available surface meshes are not directly suited for training, mainly because of two reasons. First, no separation exists in between the different teeth or between the teeth and the gum. Second, no information is available at the interstices between the teeth. Therefore, further processing of the surface meshes is needed to address the issues. Both issues are dealt with in two separate and subsequent steps. In a first step the individual teeth surfaces are extracted from the surface meshes. Subsequently, the extracted teeth surfaces are completed at the level of the interstices.

As a first step, all teeth are extracted from the surface mesh of the dental cast. Thereby the teeth need to be separated from each other as well as from the gums. This can be done manually. However, in the literature a number of (semi)-automated algorithms are presented for this purpose.

Ideally, the result of the teeth extraction step is a set of surface meshes of individual teeth. Most often these surface meshes are open at the mesial and distal side, where the tooth makes contact with its neighbouring teeth. As pointed out above this poses problems for the training phase, as full crowns are needed. A possible solution would be to use level set based surface reconstruction techniques. Another solution is to deform a template shape towards each of the training samples using non-rigid surface registration. If the template shape is a full crown and the non-rigid registration algorithm is robust against outliers, this approach solves the surface completion problem. A benefit of this approach is that small segmentation errors can be corrected for. Furthermore, the resolution of the template shape can be adapted to specific needs. A drawback of this approach is that some fine details present in the segmented surface mesh might not be observable in the deformed template shape. Template shapes for each type of crown are available from existing libraries.

The full registration pipeline comprises three steps. In a first step, an initial rigid alignment is computed using the manually indicated landmarks on the input surface mesh and the template shape. Next, the rigid alignment is further refined via a rigid registration algorithm. Finally, a non-rigid registration algorithm is used to deform the rigidly aligned template shape towards the extracted crown. A variant of the well-established Iterative Closest Points (ICP) algorithm is used for both the rigid and non-rigid registration. ICP aligns two sets of points without correspondences in an iterative manner. Each iteration contains two steps. First, corresponding points are estimated. Next, based on the corresponding points, the alignment is updated. Corresponding points are computed using the closest point strategy. Iterations are performed until the difference between two successive iterations becomes minimal.

The evaluation of the symmetric shape energy function term can be greatly simplified if corresponding points exist between the left and right teeth. Therefore, the right template crowns are mirrored to generate the left template crowns.

This procedure results in a training data set of virtual teeth setups. Each virtual teeth setup comprises a set of crowns with a shape and pose extracted from the underlying dental cast. Before the training data set can be used for the construction of statistical models, all training data should be positioned in the same reference frame. Therefore, first a mean virtual teeth setup is computed. Next, the mean virtual teeth setup is positioned correctly. Finally, all virtual teeth setups are aligned to the mean. Each of these steps is further detailed below. Alignment of two virtual teeth setups is discussed first, as this is needed for computing a mean virtual teeth setup.

The manually indicated landmarks on the surface meshes serve as guides for the alignment. These landmarks can easily be transferred to the different teeth in the virtual teeth setup. Since correspondences exist between the landmarks, a rigid transformation aligning both virtual teeth setups can be computed. A peculiarity arises when transforming a virtual teeth setup, as a distinction is made between pose and shape. Therefore, applying a rigid transformation on a virtual teeth setup only affects the pose of the teeth. In a mathematical formulation it can be expressed as $$S' = \phi(S) \qquad (49)$$
$$= \{\phi(\mathcal{T}_i)\}_{i=1}^{|D|}$$

where $\varphi$ is the transformation operator. If a point of the tooth $T_i$ in the local reference frame is given by $v \in V_{T_i}$, the point in the global reference frame is given by $$x = R_{T_i} v + t_{T_i}. \qquad (50)$$

where $R_{T_i}$ and $t_{T_i}$ describe the pose of the tooth. Transforming the tooth $T_i$ comes down to applying the transformation $\varphi$ on all points of the tooth. This can be formulated as $$x' = \phi(x) \qquad (51)$$
$$= \phi(R_{T_i}v + t_{T_i})$$

If the transformation $\varphi$ is a rigid transformation consisting of a rotation matrix $R \in SO(3)$ and translation vector $t \in R^3$, the expression above can be simplified as $$x' = R(R_{T_i}v + t_{T_i}) + t \qquad (52)$$
$$= RR_{T_i}v + Rt_{T_i} + t$$
$$= R'_{T_i}v + t'_{T_i},$$

Where $R'_{Ti}=RR_{Ti}$ and $t'_{Ti}=Rt_{Ti}+t$. As such, a rigid transformation only affects the pose of a tooth.

The computation of a mean virtual teeth setup is an iterative procedure. This procedure starts from an initial estimate of the mean (one of the training samples). In each iteration all virtual teeth setups are aligned to the current estimate for the mean, followed by an updating of the mean. Iterations are performed until no relevant change exists between two successive iterations. The alignment of virtual teeth setups has already been explained above. The updating of the mean from aligned virtual teeth setups is now addressed.

The mean virtual teeth setup contains teeth with a mean shape and mean pose. Therefore, for each tooth a mean shape and mean pose needs to be computed. Computing a mean shape from a set of shapes requires aligning all shapes to a common reference frame. Since correspondences exist between the different shapes, aligning all shapes to the current mean shape is straightforward. It should be noted that the shapes are aligned and not the teeth themselves. Therefore, applying a rigid transformation to the shape of a tooth also affects the pose of the tooth. This can be shown from the fact that a point x of the tooth in a global reference frame should not be altered by the rigid transformation of its shape, as given by $$x = R_T v + t_T \qquad (53)$$
$$= R'_T(Rv + t) + t'_T$$

where $R \in SO(3)$ and $t \in R^3$ is the rigid transformation, and $R_T$ and $t_T$ define the pose of tooth T. From this the following expressions can be derived for the updated pose $$R_T' = R_T R^T$$

$$t_T' = t_T - R_T' t$$

Once the shapes are aligned, the mean shape can be computed.

Prior to computing the mean pose for a tooth, all shapes should be aligned to the mean shape using the approach discussed here. Computing the mean pose, i.e. the mean rigid transformation matrix, is not straightforward since rigid transformation matrices do not form a vector space. Instead they form a Lie group. Therefore, the mean pose should be computed in this Lie group. Algorithms exist for this task.

The aesthetic landmarks energy function term discussed previously imposes some constraints on the positioning of the mean virtual teeth setup. In order for the different measures to be valid, the mean virtual teeth setup has to be positioned as follows. The z-axis should be perpendicular to the occlusal plane and point in the inferior direction for the upper jaw. The y-axis should be perpendicular to the coronal plane and point in the ventral direction. From these, the x-axis is parallel to the mediolateral axis and points from the patient's right to left.

Positioning the mean virtual teeth setup correctly is achieved in four subsequent steps. Each of these steps is now detailed further.

1. The z-direction is determined as the vector perpendicular to the occlusal plane. The occlusal plane itself is computed as the plane that fits through a set of relevant landmarks $\{m_i\}$, $i=1, \ldots, N$. These landmarks are a subset of the manually indicated landmarks on the anatomical surface mesh.
2. The x-direction is computed as the normal vector on the symmetry plane that points from right to left. The symmetry plane can be determined from the planar symmetry transformation, where the symmetry maps the left and right sides onto each other. From the landmarks the right-to-left direction can be computed as well. As such, the normal vector should point into the same direction. If this is not the case, the x-direction is flipped. However, to correct for the fact that x and z are not guaranteed to be orthogonal with respect to each other, the following procedure is followed. The x-vector is expressed as a linear combination of z and n, as given by $$x = \alpha z + \beta n \qquad (54)$$

where $\alpha$ and $\beta$ are linear coefficients. As such, x is constrained to the plane determined by z and n. As x should be orthogonal to z and have unit length, the following to equations can be used to determine the coefficients $\alpha$ and $\beta$, $$x \cdot z = 0 \qquad (55)$$

$$\|x\| = 1 \qquad (56)$$

Combining equations 54 and 55 results in the following expression for $\alpha$ $$\alpha = -\beta n \cdot z \qquad (57)$$

Combining equations 54 and 56 results in the following derivation $$\|x\| = \alpha^2 + \beta^2 + 2\alpha\beta n \cdot z \qquad (58)$$
$$= \beta^2(n \cdot z)^2 + \beta^2 - 2\beta^2(n \cdot z)^2$$
$$= \beta^2(1 - (n \cdot z)^2) = 1.$$

From this derivation, $\beta$ can be expressed as $$\beta = \pm\sqrt{\frac{1}{1 - (n \cdot z)^2}} \qquad (59)$$

As can be seen from the previous expression for β two solutions exist. The solution which results in an x-direction pointing from right to left is picked.

3. The y-direction is computed as the cross product between the x-direction and z-direction. The y-direction should point from the posterior teeth towards the anterior teeth. Again from the landmarks, the posterior-to-anterior direction can be computed. If needed, the z-direction is flipped so the y-direction aligns with the posterior-to-anterior direction.
4. The origin is computed as the centre point of the selected landmarks {mi}, i=1, . . . , N in the occlusal plane.

Given the x-, y-, z-direction and the origin, a rigid transformation matrix can be composed as $$T = \begin{bmatrix} x^T & -c_x \\ y^T & -c_y \\ z^T & -c_z \\ 0 & 1 \end{bmatrix} \quad (60)$$

where $c=[c_x, c_y, c_z]^T$ is the new origin. This transforms the mean virtual teeth setup from its current position to the required position.

The set of statistical models comprises three types of models: individual shape models ($\vartheta_T$), posterior shape models ($\vartheta_{TT}$) and posterior pose models ($\varphi_{TT}$). The necessary training data are generated by aligning all virtual teeth setups to the mean virtual teeth setup and extracting the relevant shape(s) or poses. For the posterior models an additional degree of freedom exists. These models describe a relation between the pose or shape of two teeth. However, the pairs of teeth for which this relation should be modelled are undefined. These pairs in fact define the structure of the overall posterior model. A possible solution would be to use each possible pair of teeth. Another solution defines the pairs of teeth to be used in an automated manner based on the quality of the respective models. However, this solution largely depends on the quality and quantity of the training samples. Furthermore, a threshold on the quality needs to be imposed, which is hard to define. As such, in spite of its importance for the posterior models, no established solution exists. Therefore, the pairs of teeth to be used are defined manually. This allows incorporating some knowledge and assumptions into the posterior models. Pairs are defined as all mesial-distal neighbouring teeth, as well as the left/right corresponding teeth. Since the posterior models are directed, for each pair, two models are constructed. For an illustration on the defined pairs, see FIG. 6.

Both symmetry based energy function terms require a local mirroring transformation for each pair of corresponding left and right teeth. This local mirroring transformation involves a rigid transformation and a mirroring operation, combined in a single matrix, the mirrored rigid transformation matrix. Given a set of corresponding points, this mirrored rigid transformation matrix can be determined in a manner similarly to a standard rigid transformation matrix. However, the constraint on the determinant of the rotation matrix det(R)=1 should be replaced by the constraint det(R)=−1.

The approach proposed here for estimating a mirrored rigid transformation matrix for a pair of corresponding left and right teeth employs a surface alignment procedure similar to ICP. ICP is an iterative approach for aligning two sets of points. In each iteration corresponding points are estimated, followed by updating the transformation. In this case the type of transformation is a mirrored rigid transformation. Correspondences are estimated as closest points on the target surface mesh. Iterations are performed until the change between two successive iterations becomes minimal. This approach quickly converges to a steady state solution.

The contact points defined on the shape of the teeth define the contact areas between neighbouring teeth in the mesial and distal direction. These are required for the contact point energy function term that enforces mesial and distal neighbouring teeth to make contact with each other. As such, gaps between the teeth are avoided. The contact points are stored in a directed graph-like structure where the nodes correspond to the different teeth, and the edges correspond to the mesial and distal relationships between the teeth. Each directed edge contains a set of contact points defined on the source tooth that make contact with the target tooth. The contact points for each mesial-distal connection are determined from the set of training data using the following approach. Given a mesial tooth $T_M$ and a distal tooth $T_D$, each with a pose given by $R_M$ and $t_M$, and $R_D$ and $t_D$, and each with a shape given by a set of points $V_M$ and $V_D$, contact points are defined as the points within a tolerance distance $\tau$ from the other tooth $$C_{MD} = \{v_i | d(T_D, R_M v_i + t_M) < \tau, v_i \in V_M\}$$

$$C_{DM} = \{v_i | d(T_D, R_M v_i + t_M) < \tau, v_i \in V_D\}$$

where d(•,) is the minimal distance between a point and a tooth. For each training sample containing the teeth $T_M$ and $T_D$ sets $C_{MD}$ and $C_{DM}$ can be computed. The number of appearances $n^D$ of points $v_i \in V_D$ in the set $C_{DM}$ is computed. From these, the sets of contact points $P_{MD}$ and $P_{DM}$ are defined as the points that appear more than a fraction ρ of the maximum appearing points max({nMi}) and max({nDi}), respectively.

The aesthetic landmarks energy function terms make use of a set of predefined aesthetic landmarks. For an overview of these landmarks see Tables 1 and 2. These landmarks are defined as extremal points in some direction on the mean virtual teeth setup. As a prerequisite, the mean virtual teeth setup should be positioned correctly as outlined above. The landmarks on the incisal edge and cusp are defined as the extremal points in the z-direction. The medial landmarks are defined as the points closest to the midline in the x-direction. The lateral landmarks are defined as the most lateral points in the x-direction.

A critical aspect of the proposed algorithm relates to the optimization of the energy function. The effectiveness of the optimization approach has a direct influence on the quality of the results. Given the nature of the energy function terms, a numerical optimization algorithm needs to be used. Numerical optimization is a well-established research area with a vast number of publications and algorithms. As a result, a number of efficient numerical optimization algorithms exist, that have proven to be effective for a wide range of applications.

Numerical optimization algorithms applicable here all start from a starting point denoted by $S_0$, typically set by a user. In this case the mean virtual teeth setup can be used as a starting point. Beginning from $S_0$, the optimization algorithms generate a sequence of iterates {Sk}, k=1, . . . , ∞. This process terminates when no more progress can be made, or when the iterate $S_k$ is sufficiently close to a solution. Moving from one iterate to the next is based on information of the energy function in the current iterate $S_k$, and possibly earlier iterates $S_0, \ldots, S_{k-1}$ as well. Therefore, two strategies exist: line search methods and trust region methods. The line search methods select a direction $p_k$ and search along that direction for a new iterate $S_{k+1}$ with a sufficiently low energy. As such, these methods can be given by $$\min_{\alpha > 0} E(S_k + \alpha p_k)$$

where the summation should be interpreted as applying the step $\alpha p_k$ to $S_k$. The trust region methods, on the other hand, construct a model function $M_k$ that locally approximates the energy function based on the information gathered from previous iterates. Within a predefined region, the trust region, a minimizer for the model function is computed. As such, these methods can be represented as $$\min_p M_k(S_k + p)$$

where $S_k + p$ lies in the trust region. Typically, the model function is quadratic. As a conclusion, the line search methods first fix a search direction and next seek a step length, whereas the trust region methods first fix a maximum step length and next seek a direction and step length.

Both strategies are only guaranteed to find a local solution, dependent upon the energy function and the starting point $S_0$. Therefore, choosing a good starting point is of utmost importance.

In the algorithm according to certain embodiments of the invention only line search based optimization methods are used, as they are more tailored for this application. Before proceeding with the specifics of the problem at hand, two important issues need to be addressed. First, a strategy for finding the search direction $p_k$ needs to be devised. Second, a method for finding a suitable step length $\alpha$ is needed.

A straightforward approach for finding the search direction is to use the negative gradient of the energy function as search direction.

$$P_k = -\nabla E(S_k)$$

This results in the locally steepest descent direction of the energy function. However, in spite of the limited computation time required, since only the gradient needs to be computed, this approach can be extremely slow.

Another important search direction is the Newton direction. This direction is obtained from a second order Taylor series expansion of $E(S_k + p)$ $$E(S_k + p) \approx E(S_k) + p^T \nabla E(S_k) + \tfrac{1}{2} p^T \nabla^2 E(S_k) p$$

Setting the derivative of this expression equal to zero results in the following expression for the optimal search direction.

$$P_k = -(\nabla^2 E(S_k))^{-1} \nabla E(S_k)$$

This search direction is more reliable when the energy function can locally be represented by a quadratic function. A prerequisite for the search direction to be valid is that the Hessian matrix $\nabla^2 E(S_k)$ should be positive definite. This strategy results in a faster convergence rate compared to the steepest descent approach. However, in each iteration the Hessian matrix needs to be computed which is computationally expensive and might be impossible for large scale problems.

Quasi-Newton methods overcome this disadvantage by approximating the Hessian matrix with another matrix $B_k$. As such, they do not require the computation of the Hessian matrix and yet still have a fast convergence rate. The matrix $B_k$ is updated after each step with the additional knowledge gained during the step. This additional knowledge is based on the fact that changes in the gradient provide information on the second derivative along the search direction, as given by $$\nabla^2 E(S_k)(S_{k+1} - S_k) \approx \nabla E(S_{k+1}) - \nabla E(S_k)$$

The approximation of the Hessian matrix is chosen as to mimic the above expression. Therefore, it should satisfy the secant equation $$B_{k+1} s_k = y_k$$

where $s_k = S_{k+1} - S_k$ and $y_k = \nabla E(S_{k+1}) - \nabla E(S_k)$. Given this expression and some additional conditions, expressions for updating the matrix $B_k$ can be formulated. A widely used expression is the BFGS formula given by $$B_{k+1} = B_k - \frac{B_k s_k s_k^T B_k}{s_k^T B_k s_k} + \frac{y_k y_k^T}{y_k^T s_k} \tag{61}$$

The quasi-Newton search direction is obtained by replacing the Hessian matrix with its approximation in the Newton direction $$p_k = -B_k^{-1} \nabla E(S_k)$$

Some quasi-Newton methods avoid the computation of the inverse matrix $B_k-1$ by directly updating the inverse of $B_k$ instead of $B_k$ itself.

A final set of methods are the non-linear conjugate gradient methods. Hereby the search direction is computed as $$p_k = -\nabla E(S_k) + \beta_k p_{k-1}$$

where $\beta_k$ is a scalar that ensures that $p_k$ and $p_{k-1}$ are conjugate. Different methods exist for computing the scalar $\beta_k$, each leading to a variant of the conjugate gradient method. In general, these methods are much more effective compared to steepest descent methods, and are almost as simple to compute. They are not as fast as the Newton or quasi-Newton methods, but have the advantage of not requiring storage for matrices.

Line search algorithms compute, given a search direction $p_k$, a suitable step length $\alpha_k$ that effectively minimizes the energy function. Hereby, a trade-off exists between a sufficient reduction of the energy function and the time needed for choosing a step length. An ideal step length is the global minimum of the function $\varphi$ defined by $$\varphi(\alpha) = E(S_k \alpha p_k) \ \alpha > 0 \tag{62}$$

In general, however, computing this global minimum takes too much time. Therefore, practical line search algorithms only perform an inexact search for a step length $\alpha$ that provides a sufficient decrease of the energy function at minimal computation time. Typical line search algorithms generate a sequence of step lengths and stop whenever one of these values satisfies certain conditions. The search itself is performed in two stages. First, a bracketing algorithm finds a suitable interval containing a desirable step length. Second, a bisection algorithm finds a good step length in this interval. A set of conditions that are generally applicable are the Wolfe conditions. The first Wolfe condition, also known as the Armijo condition, states that the step length should ensure a sufficient decrease of the energy function and is given by $$\phi(\alpha) \leq \phi(0) + \mu\alpha\phi'(0)$$

where $\mu \in (0,1)$ and $\alpha(\alpha)$ is the derivative given by $$\phi'(\alpha) = \nabla E(S_k + \alpha p_k)^T p_k$$

However, this condition does not guarantee convergence, as it is satisfied for sufficiently small step lengths. Therefore, the second Wolfe condition ensures that the line search algorithm makes sufficient progress. This condition is given by $$\phi'(\alpha) \geq \eta\phi'(0)$$

where $\eta \in (\mu, 1)$. This condition ensures that the slope of $\phi(\alpha)$ is greater than $\eta$ times the initial slope. This condition is also known as the curvature condition since it implies $$\phi'(\alpha) - \phi'(0) \geq (\eta - 1)\phi'(0)$$

$$\phi'(\alpha) - \phi'(0) \geq (1 - \eta)|\phi'(0)|$$

As such, the average curvature of $\phi$ on $(0, \alpha)$ is positive. A slight modification of the Wolfe conditions leads to the strong Wolfe conditions given by $$\phi(\alpha) \leq \phi(0) + \mu\alpha\phi'(0)$$

$$|\phi'(\alpha)| \leq \eta|\phi'(0)|.$$

The only difference is that the derivative $\phi'(\alpha)$ is no longer allowed to be too positive. As such, points far from a solution are excluded.

A powerful line search algorithm is the Moré-Thuente algorithm. Given an interval $[\alpha_{min}, \alpha_{max}]$, this line search algorithm generates a sequence of nested intervals $l_k$ and a sequence of iterates $\alpha_k \in l_k \cap [\alpha_{min}, \alpha_{max}]$ until the strong Wolfe conditions are satisfied.

An initial estimate on the step length $\alpha_k$ can be generated by applying step length learning. Based on the selected step length $\alpha_{k-1}$ of the previous line search, an estimate on the step length $\hat{\alpha}_k$ for the current line search can be generated. This estimate is given by $$\hat{\alpha}_k = \alpha_{k-1} \sqrt{\frac{p_{k-1}^T p_{k-1}}{p_k^T p_k}} \quad (63)$$

The application of step length learning in combination with the Moré-Thuente algorithm results in a very effective line search algorithm. In practice this algorithm usually converges within one or two iterations.

Various optimization algorithms are available for optimizing the energy function. Gradient descent is a line search based optimization algorithm. As such, starting from a starting point S0, a sequence of iterates $\{S_k\}$, $k=1, \ldots, \infty$ is generated until convergence. Each iterate $S_{k+1}$ is generated by performing a line search along the direction $p_k$ computed at the previous iterate $S_k$. The search direction $p_k$ is computed following the steepest descent strategy. Various line search algorithms can be used, ranging from a fixed step length to the Moré-Thuente algorithm. The gradient descent algorithm is widely used because of its simplicity.

A more complex optimization algorithm is the non-linear conjugate gradient algorithm. Similar to the gradient descent algorithm, this algorithm is a line search based optimization algorithm as well. Originally, the conjugate gradient algorithm was proposed for solving large scale linear systems of equations given by $$Ax = b \quad (64)$$

where A is n×n symmetric positive definite. This problem can as well be stated as a minimization problem of the following function $$\phi(x) = \tfrac{1}{2} x^T A x - b^T x \quad (65)$$

The linear conjugate gradient method is able to minimize this function in n steps along search directions $p_i$ conjugate with respect to the matrix A.

$$p_i^T A p_j = 0 \; \forall i \neq j \quad (66)$$

The step length along each direction can be computed as $$\alpha_k = -\frac{r_k^T p_k}{p_k^T A p_k} \quad (67)$$

where $r_k = \nabla\phi(x_k) = Ax_k - b$. A particular property of the conjugate gradient method is that in generating a set of conjugate directions, a new direction $p_k$ can be computed using only the previous direction $p_{k-1}$. No information on the directions $p_0, \ldots, p_{k-2}$ is needed. The expression for the direction $p_k$ is given by $$p_k = -r_k + \beta_k p_{k-1} \quad (68)$$

where $\beta_k$ is determined as to ensure $p_k$ and $p_{k-1}$ are conjugate with respect to A, and is given by $$\beta_k = \frac{r_k^T A p_{k-1}}{p_{k-1}^T A p_{k-1}} \quad (69)$$

Both the expression for the step length $\alpha_k$ as the expression for $\beta_k$ can be simplified further. The resulting expressions are given by $$\alpha_k = \frac{r_k^T r_k}{p_k^T A p_k} \quad (70)$$

and $$\beta_k = \frac{r_k^T r_k}{r_{k-1}^T r_{k-1}} \quad (71)$$

As such, each iteration of the conjugate gradient algorithm contains the following steps. First, given the current $x_k$ and $p_k$, the step length $\alpha_k$ is computed using expression 70 and $x_{k+1}$ is computed as $x_{k+1} = x_k + \alpha_k p_k$. Next, the residual vector $r_{k+1}$ is updated as $r_{k+1} = r_k + \alpha_k A p_k$. Finally, the value $\beta_{k+1}$ is computed from expression 71 and a new search direction is computed from expression 68.

The linear conjugate gradient algorithm can be extended to general non-linear energy functions as well, e.g. E(S). Hereby, two important changes to the linear algorithm are needed. First, expression 70 needs to be replaced with a general line searching algorithm. Experimental observations suggest that it is advantageous to perform a more accurate line search. Second, the residual $r_k$ must be replaced by the gradient of the energy function $\nabla E(S)$. Some authors have presented different expressions for $\beta_k$, resulting in variants of the non-linear conjugate gradient algorithm. Moreover, most implementations enable a restart of the non-linear conjugate gradient algorithm after a number of iterations. A restart discards the information from the previous search direction by setting $\beta_k=0$, as such taking a steepest descent step. Some implementations include different strategies for restarting. A popular strategy is to enforce a restart if two consecutive gradients are far from orthogonal, as measured by $$\frac{|\Delta E|(S_k)^T \nabla E(S_{k-1})}{\|\nabla E(S_k)\|^2} \geq v \qquad (72)$$

where a typical value for v is 0.1.

The LBFGS (Limited-memory Broyden-Fletcher-Goldfarb-Shanno) optimization algorithm is a limited-memory quasi-Newton method. These methods are useful for solving large scale optimization problems where computing the approximate Hessian matrix is difficult from a computational point of view. Therefore, instead of storing the full approximate Hessian matrix, a few vectors are stored that define the approximate Hessian matrix implicitly. The specific optimization algorithm presented here is derived from the BFGS optimization algorithm. Before elaborating further on the limited-memory version, first the BFGS algorithm itself is presented.

As stated above, quasi-Newton methods make use of an approximate Hessian matrix to compute the search direction. To derive an expression for the approximate Hessian matrix, the energy function is locally approximated by a quadratic function $M_k$ given by $$M_k(p) = E(S_k) + \nabla E(S_k)^T p + \tfrac{1}{2} p^T B_k p \qquad (73)$$

where p is the search direction and $B_k$ is the approximate Hessian matrix at $S_k$. The matrix $B_k$ should be symmetric and positive definite. Imposing the constraints that $\nabla M_k(0) = \nabla E(S_k)$ and $\nabla M_k(-\alpha_{k-1} p_{k-1}) = \nabla E(S_{k-1})$, yields the following expression $$\alpha_{k-1} B_k p_{k-1} = \nabla E(S_k) - \nabla E(S_{k-1}) \qquad (74)$$

which can also be formulated as $$B_k s_{k-1} = y_{k-1} \qquad (75)$$

where $s_{k-1} = \alpha_{k-1} p_{k-1}$ and $y_{k-1} = \nabla E(S_k) - \nabla E(S_{k-1})$. A necessary condition for solving this expression is given by $$s_k^T y_k \qquad (76)$$

since $B_k$ should be positive definite. This condition imposes constraints on the line search algorithm, and is valid if the Wolfe or strong Wolfe conditions are satisfied. Estimating $B_k$ from expression 75, given the symmetry and positive definite constraints, still results in an indefinite problem. Therefore, additional constraints are imposed. A possible constraint enforces the matrix $B_k$ to be close to the matrix $B_{k-1}$ from the previous iteration, using an appropriate matrix norm. The BFGS method, however, enforces these constraints on the inverse of the approximate Hessian matrix $H_k$. As such, the matrix $H_{k+1}$ is the solution of the following problem $$\min \|H - H_{k-1}\| \text{ subject to } H = H^T \text{ and } H y_k = s_k.$$

This leads to the following expression for updating the matrix $H_k$ $$H_{k+1} = V_k^T H_k V_k + \rho_k s_k s_k^T \qquad (77)$$

where $$V_k = I - \rho_k y_k s_k^T, \rho_k = \frac{1}{y_k^T s_k}.$$

Given the matrix $H_k$ a new search direction can be computed as $$p_k = -H_k \nabla E(S_k) \qquad (78)$$

As such, each iteration of the BFGS algorithm is composed of the following steps. First, a new search direction $p_k$ is computed as given by expression 78. Next, a line search algorithm is used to select an appropriate step length $\alpha_k$ and the solution $S_{k+1}$ is computed accordingly. Finally, the $s_k$ and $y_k$ are computed and the matrix $H_{k+1}$ is updated as given by expression 77. As stated above, the LBFGS algorithm is the limited-memory version of the BFGS algorithm. The LBFGS algorithm stores a modified version of the matrix $H_k$ implicitly, by storing a number of the vector pairs $\{(s_i, y_i)\}$, i=k−m, . . . , k, where m denotes the number of pairs. From these, the product $H_k \nabla E(S_k)$ can be computed as a sequence of inner products and vector summations. If a new iterate is computed, the oldest pair $(s_{k-m-1}, y_{k-m-1})$ is replaced by the latest pair $(s_k, y_k)$. Given an initial matrix $H^0_k$ (that can be different in each iteration), the matrix $H_k$ can be computed as $$H_k = \left(V_{k-1}^T \ldots V_{k-m}^T\right) H_k^0 (V_{k-m} \ldots V_{k-1}) + $$
$$\rho_{k-m}\left(V_{k-1}^T \ldots V_{k-m+1}^T\right) s_{k-m} s_{k-m}^T (V_{k-m+1} \ldots V_{k-1}) + $$
$$\rho_{k-m+1}\left(V_{k-1}^T \ldots V_{k-m+2}^T\right) s_{k-m+1} s_{k-m+1}^T (V_{k-m+2} \ldots V_{k-1}) + $$
$$\ldots + \rho_{k-1} s_{k-1} s_{k-1}^T$$

A method for choosing $H_k^0$ is to set $H_k^0 = \gamma_k I$ where $$\gamma_k = \frac{s_{k-1}^T y_{k-1}}{y_{k-1}^T y_{k-1}} \qquad (79)$$

A recursive algorithm to compute $H_k \nabla E(S_k)$ exists. The LBFGS algorithm closely resembles the BFGS algorithm. However, in each iteration the search direction is computed using the recursive algorithm for $H_k \nabla E(S_k)$, given the estimate for $H_k^0$. Furthermore, the set of vector pairs to be retained is updated. Experimental observations suggest that it is advantageous to perform a fairly inaccurate line search.

The practical implementation of the above discussed line search based numerical optimization algorithms is now presented. The objective is to detail the optimization procedure of the virtual teeth setup algorithm, given the necessary inputs, models, etc.

The shapes of the teeth can be represented directly by the coordinates of the points belonging to that shape. Another option is to make direct use of the employed statistical shape models, i.e. Principal Component Analysis (PCA) models. PCA enables for a linear formulation of each shape x permissible by the model, as is given by $$x(b_1, \ldots, b_s) = \bar{x} + \sum_{m=1}^{s} b_m e_m \qquad (80)$$

where $\bar{x}$ is the mean shape, $\{e_i\}(i=1, \ldots, s)$ are the principal components and $\{b_i\}(i=1, \ldots, s)$ are the deformation coefficients. From this expression it follows that shapes permissible by the model can be represented by the set of deformation coefficients, making direct use of the dimensionality reduction capabilities of PCA. An advantage of this approach is that it leads to a lower dimensional optimization problem, beneficial in terms of memory requirements and computation time. On the other hand, only shapes permissible by the model can be presented, which reduces the flexibility. This poses some demands on the quantity of the available training samples. The virtual teeth setup algorithm presented here makes use of the deformation coefficient based representation.

As pointed out above, a good starting position (or initial virtual teeth setup) is needed for the numerical optimization algorithms to succeed. A trade-off between the quality of the starting position and necessary input from the user, is to provide the mean virtual teeth setup as starting position.

The different statistical models, planar symmetry transforms, etc. are all defined in the same reference frame as the mean virtual teeth setup. On the other hand, the anatomical surface mesh, provided as input by the user, is positioned in a different reference frame. Therefore, the anatomical surface mesh should be aligned with the mean virtual teeth setup. A reliable and effective approach is to make use of the anatomical landmarks defined on the mean virtual teeth setup. This requires the user to provide these landmarks on the anatomical surface mesh as additional input.

The numerical optimization algorithms all make use of the gradient of the energy function $\nabla E(S)$. The gradient is a vector containing the partial derivatives with respect to the different virtual teeth setup parameters. These parameters comprise the pose and deformation coefficients for each tooth of the virtual teeth setup. The pose parameters comprise the translational components $t_x$, $t_y$ and $t_z$, and the rotational components $\omega_x$, $\omega_y$ and $\omega_z$. The deformation coefficients are the parameters $b_m$ in equation 80.

An important remark can be made on the pose dependent energy function terms. Since pose is in essence a rigid transformation matrix, no standard computation of the gradient is possible. All gradient computations need to be performed in the Lie algebra se(3) of the Lie group SE(3), the group of all rigid transformation matrices. This also has implications for the line search algorithm. As explained previously, the line search algorithm seeks for a suitable step length $\alpha_k$, given a search direction $p_k$. In a standard numerical optimization problem, the step length defines the next iterate of the optimization algorithm as $$S_{k+1} = S_k + \alpha_k p_k \tag{81}$$

However, in this case this operation is not directly applicable for two reasons, as the summation between a virtual teeth setup and a vector is not defined. Further, this summation is not valid for poses. To overcome the former problem, an operator is defined that vectorizes a virtual teeth setup. This operator is given by $v: \mathbb{S} \mapsto \mathbb{R}^n$; with a slight abuse of notation, S as the space of all virtual teeth setups. This vectorized representation contains the deformation coefficients and pose for all teeth in the virtual teeth setup. To overcome the latter problem, a second operator is defined that applies the step $\alpha_k p_k$ to the vectorized virtual teeth setup $S_k$. This operator is given by $\zeta: \mathbb{R}^n \times \mathbb{R}^n \to \mathbb{R}^n$. As such, expression 81 can be correctly given by $$S_{k+1} = v^{-1}(\zeta(v(S_k), \alpha_k p_k)) \tag{82}$$

For the deformation coefficients the operator $\zeta$ corresponds to a simple summation. For the poses, however, the operation is slightly more complicated, as the gradient is computed in the Lie algebra se(3). Hence, the operation contains three steps, (1) map the pose to the Lie algebra, (2) apply the gradient in the Lie algebra, and (3) map the result again to the original Lie group.

Based on observations from experiments, the optimization procedure is split into two subsequent steps. In the first optimization step the relevant teeth of the virtual teeth setup are fitted to the present anatomical information, whereas in the second optimization step the teeth to be restored are designed. The result of the first optimization step is used as starting point for the second optimization step. The splitting is accomplished by assigning one of three possible states to each tooth in the virtual teeth setup. These states determine if a tooth participates in the optimization procedure. The three possible states are active, idle, and passive. A tooth with the status active takes part in the optimization procedure. The distinction between idle and passive exists since posterior models make use of pairs of teeth. A tooth with the idle state does not directly take part in the optimization procedure, however, it can indirectly take part through posterior models. A tooth with the passive state cannot be used by the posterior models, and therefore does not take part in the optimization procedure. In the first optimization step, the teeth to be restored are assigned the passive state, and the remaining teeth are assigned the active state. In the second optimization step, the teeth to be restored become active and the remaining teeth become idle. Furthermore, both steps use a slightly different energy function. The energy function of the first optimization steps consists of the following energy function terms: landmarks term, surface term, shape model term, posterior shape model term, and posterior pose model term. The model-based terms are added to regularize (or robustify) the optimization. The second optimization step contains the following energy function terms: shape model term, posterior shape model term, posterior pose model term, pose symmetry term, shape symmetry term, contact points term, aesthetic landmarks term, and (possibly) antagonist overlap term. When computing the gradients of the energy function term, only the teeth with the active state are of interest.

To stop an optimization procedure, two criteria are used. First, the optimization is stopped whenever the change between two subsequent iterates $S_{k+1}$ and $S_k$ drops below a user controlled threshold. Second, the maximum number of iterations is limited. This allows the user to control the maximal running time of the algorithm.

The energy function cannot encode all requirements imposed on the algorithm. Some of these requirements can be met by a post-processing step. Hereby, the result of the second optimization step is modified in a post-processing step to satisfy one or more requirements. The two most important requirements that can be solved for by a post-processing step are the ones related to overlap and occlusion. Another type of post-processing is to fit crowns from various available libraries to the final result.

The level of anatomical detail present on the teeth estimated by the algorithm depends on a number of factors. The single most important factor is the quality of the training samples. However, even if an elaborate training data set of high quality is available, the employed statistical shape models smear out some of the fine grained details because of individual differences in the anatomical details. Another factor influencing the level of detail is the resolution of the template crowns used for the non-rigid registration. Mainly for computational reasons this resolution should be rather coarse, which inevitably results in the loss of some anatomical details. A possible solution to overcome this is to fit crowns available from a library to the teeth resulting from the second optimization step. A variety of such libraries exist, each with differently shaped crowns. Which library to use can be specified by the user, based on experience or preference. Another option is to try all available libraries and to select the best fitting one.

Fitting a library crown C to a tooth T resulting from the second optimization step is achieved by defining corresponding points between both shapes. Based on the corresponding points a non-rigid deformation field is generated that deforms the library crown C towards the tooth T. The corresponding points are generated in an offline procedure and saved to file, as such they do not need to be recomputed each time. First, the procedure for generating the corresponding points is presented. Subsequently, the computation of the non-rigid deformation field is discussed.

The corresponding points are generated by fitting the underlying statistical shape model OT of tooth T to the library crown C. Therefore, a registration based approach where the deformations are governed by the statistical shape model is pursued. This approach needs to be robust against possible outliers originating from non-overlapping regions. This registration results in a tooth T'. Next, for each point of T', the surface based distance to C is computed. The distances are thresholded by a user specified threshold and all remaining points are clustered to a user specified number of clusters, using the farthest point clustering algorithm. The centres of these clusters define the corresponding points on the statistical shape model ϑT and thus all shapes generated from this model. The respective points on the crown C closest to the cluster centres define the corresponding points on C. This procedure is illustrated in FIG. 10. The same procedure needs to be repeated for all crowns and all libraries only once, the results can be saved to file and reused during the fitting procedure.

Given the corresponding points various non-rigid deformation fields can be computed. Here a Thin-Plate Spline (TPS) deformation field is used. In fact, the TPS fits a mapping function $\{s_i\}$, i=1, ..., N and $\{t_i\}$, i=1, ..., N, where the former are the corresponding points on the tooth T and the latter are the corresponding points on the crown C. The resulting deformation of the library crown can be further refined using any available non-rigid registration algorithm. However, this will result in an increased computation time.

An important requirement imposed on the virtual teeth setup algorithm is to prevent neighbouring teeth from overlapping with each other. As discussed previously, this requirement is in fact a constraint and should be handled as such. However, numerical optimization of the energy function with respect to this constraint is computationally infeasible. Therefore, an additional post-processing step is included to satisfy this constraint. Furthermore, it should be noted that the contact point term partially takes this constraint into account. Therefore, in general only slight modifications of the teeth shapes are needed.

The overlap removing post-processing step consists of an iterative process. Each iteration has two steps. First, the maximal overlapping points are detected. Second, the tooth shape is modified to remove the overlap in the detected points. Iterations are performed as long as overlap exists. As such, this procedure resembles a general registration algorithm for the alignment of two sets of points. This processing step is applied in a one-directional manner, where only one tooth is modified given the shape of its neighbouring teeth. The maximal overlapping points are detected by computing the signed distance for each point $x_T$ of a tooth T to the surface of tooth R. Next, non-minimum suppression retains only the local minima. Finally, the overlapping local minima are selected as maximal overlapping points. Non-minimum suppression compares the distance in each point with respect to the distances in the neighbouring points. If the distance in the point is smaller compared to the distances in the neighbouring points, the point is retained. The neighbours are defined along the edges of the surface mesh. Possibly, a small error threshold value r is used to be more robust against numerical inaccuracies.

After detection of the overlapping points, the shape of tooth T is deformed to remove the detected overlap. The deformation can be modelled effectively by a non-rigid transformation. Given a set of overlapping points $\{s_i \in R^3\}$, a set of target points $\{t_i \in R^3\}$ is needed to be able to define this non-rigid transformation. The target points are defined as those points $t_i$ on the surface of the neighbouring tooth R closest to the overlapping points $s_i$. It is also possible to define the target points at a certain offset of the surface of the neighbouring tooth R. Given both sets of points $\{s_i\}$ and $\{t_i\}$, a non-rigid transformation can be generated. This transformation can be either a thin-shell transformation or either a thin-plate spline transformation, depending on the order of the different post-processing steps.

A requirement of utmost importance for the acceptance of the virtual teeth setup algorithm is to take occlusal information into account. As pointed out before, establishing a perfect occlusal relationship is highly complex. Information on the antagonist crowns, as well as a simulation on the natural jaw movements is needed. However, incorporating this information in the virtual teeth setup algorithm is not feasible in the current setting. Therefore, an additional post-processing step is introduced that takes into account the shape of the antagonist crowns. This post-processing step results in a good initial estimate that should be refined further by a dental technician.

The procedure for establishing an initial occlusal relationship is closely related to the overlap removing step presented in the previous section. Similar to the previous post-processing step, this post-processing step as well consists of an iterative procedure, where each iteration consists of two steps. In the first step, occlusal contact points are defined. In the second step, the shape of the tooth is deformed as to obtain a perfect occlusal contact at the defined contact points. Iterations are performed until a relevant change occurs between two successive iterations.

Figure 11:
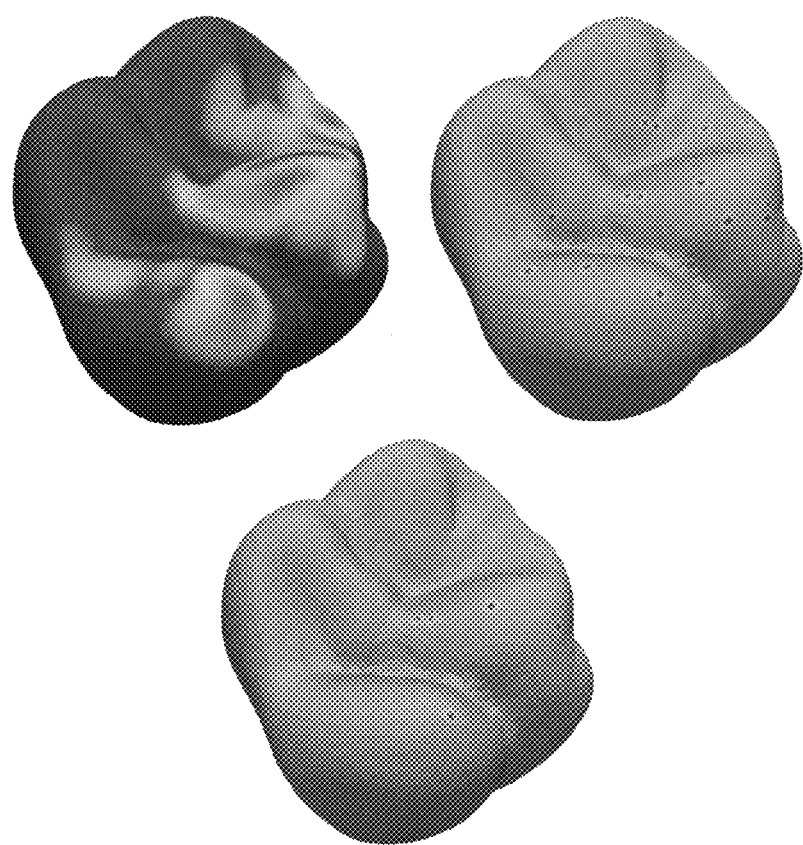
FIG. 11 illustrates the detection of occlusal contact points on the surface of a crown.

The contact points are defined in the following manner. First, for each point $x_T$ of tooth T the signed distance to the antagonist surface B is computed. Next, using non-minimum suppression a set of candidate occlusal contact points are determined. Subsequently, this set of candidate occlusal contact points is filtered to obtain the actual occlusal contact points $\{s_i \in R^3\}$. Finally, based on the occlusal contact points the shape of the tooth T is deformed as to obtain a good occlusal contact at the detected contact points. The filtering of the candidate occlusal contact points limits the number of contact points to a user defined number. Furthermore, the ratio between the contact point with the minimal distance and the maximal distance should be close to one. An additional possibility, although not used here, is to ensure the contact points are sufficiently spread over the occlusal surface of the crown. These steps are illustrated in FIG. 11.

Similar to the overlap post-processing step, the shape deformation is modelled by a non-rigid transformation. This non-rigid transformation requires an additional set of target points $\{t_i \in R^3\}$. These are defined as the points on the antagonist surface closest to the occusal contact points. Possibly, an offset of the antagonist surface is taken into account. Moreover, it is as well possible to ensure a proper alignment between the normals of both surfaces. Therefore, the negative normal of the antagonist surface $n_i^\beta$ should be aligned with the normal $n_i^T$ of the tooth shape. This can be achieved by a rotation and a translation. The rotation is defined by a rotation axis w and rotation angle $\vartheta$ given by $$\omega = \frac{n_i^T \times n_i^\beta}{\|n_i^T \times n_i^\beta\|}$$

where × is the vector cross product and $$\theta = \arccos(n_i^T \cdot n_i^\beta)$$

where · is the vector dot product. Using the exponential map of the Lie group SO(3), this can be converted to a rotation matrix R. The translation vector is given by $$t = ti - Rsi \tag{83}$$

An elegant manner to impose this on the non-rigid transformation is to not only define the deformations for the contact points, but as well for their neighbouring points.

In addition, one only wants deformations to occur at the occlusal region of the teeth. The rest of the teeth is positioned and designed in an optimal sense by the algorithm. Therefore, a set of fixed points $\{f_i \in R^3\}$ is defined for each tooth. If open template crowns are used, the points along the boundary are defined as being fixed. Otherwise, if closed template crowns are used, the side of the crown at the implant side is defined as being fixed.

Given the set of occlusal contact points $\{s_i\}$, the set of target points $\{t_i\}$, and the set of fixed points a non-rigid transformation can be generated. This transformation can be either a thin-shell transformation or either a thin-plate spline transformation, depending on the order of the different post-processing steps.

A prerequisite for this post-processing step is the availability of the antagonist surface. This surface should contain the relevant crowns of the opposing jaw as a single surface mesh. Furthermore, it should be positioned in a correct occlusal relationship as to mimic the true anatomy of the patient. Most surface scanners for dental applications enable the scanning of the opposing jaw and the recording of the correct occlusal relationship.

The current procedure outlined above is limited to a one-directional establishment of a correct occlusal relationship. Therefore, it is not possible to deform crowns both in the upper and lower jaw as to ensure a correct occlusion between them.

This approach is very similar to the overlap removing post-processing step. Therefore, both post-processing steps can be combined in a single post-processing step that removes overlap and establishes a good occlusal relationship.

Certain embodiments of the present invention are illustrated on a patient case with multiple missing anterior teeth. More specifically, the teeth from the right lateral incisor up to the left canine are missing. For this patient case no antagonist information is available. Therefore, the occlusion post-processing step as well as the antagonist overlap term cannot be used. All remaining teeth are used by the algorithm of certain embodiments of this invention to estimate the missing teeth. Library crowns are fitted to the solution from the second optimization step of the algorithm. The result is shown in FIG. 12 from a frontal, occlusal, left and right viewpoint. As can be seen from this figure, the estimated teeth perfectly fit onto the dental arch of the patient.

While certain embodiments of the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Figure 13:
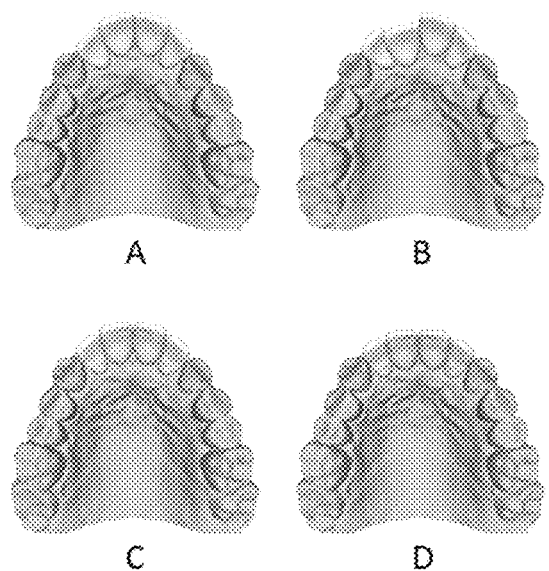
FIG. 13 illustrates the interactive updating of an initial estimation. (A) shows the result of the initial estimation; (B) shows the inputted modification by a user consisting of a modification of the position of the right frontal incisor; (C) shows the result of an updated estimation wherein the inputted modification is used as a soft constraint and (D) wherein this modification is used as a hard constraint.

In certain embodiments the present invention comprises an interactive step allowing the user to input certain modifications to an initial estimation for the missing teeth to generate an updated estimation. In an initial phase the position, orientation and shape of the missing teeth is estimated using digitized data on the patient's intraoral anatomy, a virtual teeth setup and the energy function as previously described. In a following phase the user may input modifications finetuning or correcting the estimated position, orientation and/or shape of one or more of the missing teeth. Thereafter, an updated estimation for the missing teeth is calculated using the virtual teeth setup and the energy function constrained by said inputted modifications. For the case of a patient missing multiple anterior teeth illustrated in FIG. 13, the estimated teeth are positioned too far to the front and do not follow the anatomical dental arch (FIG. 13A). Following this observation, the user needs to input an anatomically more desirable position of only one missing tooth, in this example the right central incisor (FIG. 13B), to generate an updated estimate for all missing teeth. Hereto, the virtual teeth setup algorithm constrained by this inputted modified position is used to calculate an updated estimate for the position, shape and orientation of all missing teeth. The user input can be used as a hard or soft constraint. Using the user input as a hard constraint results in an updated estimate of the positions the missing teeth (FIG. 13d) more to the palatal side than when the user input is used as a soft constraint (FIG. 13C). This is consistent with the soft constraint approach generating a result that is intermediate between the original outcome and the user inputted modifications, depending on the weight given to the energy function terms associated with the inputted modifications.

Figure 14:
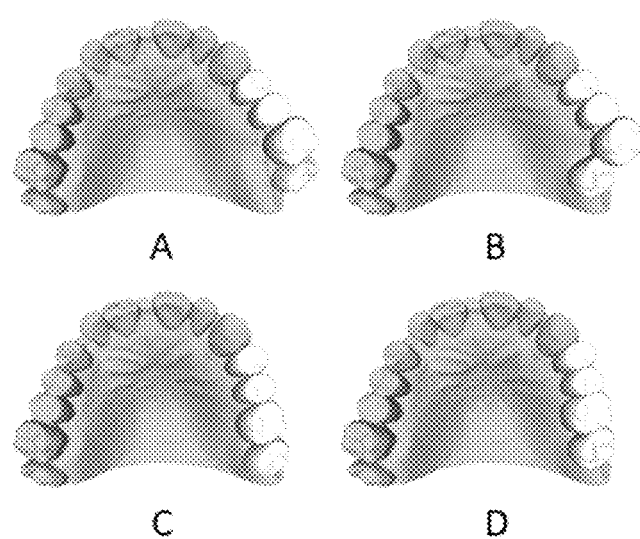
FIG. 14 illustrates the interactive updating of an initial estimation. (A) shows the result of the initial estimation; (B) shows the inputted modification by a user consisting of a modification of the position, orientation and shape of the left second molar; (C) result of an updated estimation wherein the inputted modification is used as a soft constraint and (D) wherein this modification is used as a hard constraint.

FIG. 14 illustrates a further example wherein an initial estimation is updated based on modifications inputted by the user. In this patient case an estimate is needed for four missing posterior teeth. An initial estimation positioned the missing teeth too far to the buccal side (FIG. 14A). Further, the incomplete scanning of the right second molar may have contributed to an unnatural shape estimation for the missing left second molar. Following this observation, the user only inputs a corrected position, orientation and shape for the left second molar (FIG. 14B). Thereafter, the virtual teeth setup algorithm constrained by these inputted modifications is used to calculate an updated estimate for the position, shape and orientation of all missing teeth. As shown in FIG. 14 C-D both the use of the user input as a soft (FIG. 14C) and hard constraint (FIG. 14D) provided a plausible updated estimation. The method can be implemented allowing the user to select whether inputted modifications are used as hard or soft constraints. In case the user considers that in the eventual updated estimate the modifications need to be kept as inputted, hard constraining of the modifications should be selected. On the other hand, if the user considers the inputted modifications to be tentative corrections of the initial estimate, it may be more appropriate to select soft constraining of these modifications.

The invention claimed is:

1. A computer assisted method for estimating a shape, position and orientation of a dental restoration for a partially edentulous patient, the method comprising:
   indicating one or more teeth requiring a dental restoration, for which an estimation of said shape, position and orientation is to be generated, and indicating a remaining tooth or teeth available for estimating;
   providing a virtual teeth setup comprising one or more teeth corresponding to the one or more teeth requiring said dental restoration as well as one or more teeth corresponding to the indicated remaining tooth or teeth, wherein said virtual teeth setup comprises separated surface meshes of individual teeth positioned in a dental arch or segment thereof;
   providing a digitized surface mesh of an intra-oral region of said patient comprising said indicated remaining tooth or teeth and the region of the one or more teeth requiring said dental restoration;
   applying and optimizing an energy function, representing a quality measure for said virtual teeth setup, by adapting the virtual teeth setup to one or more of said indicated remaining tooth or teeth in said digitized surface mesh of the intra-oral region of said patient given a statistical model, for a given dentition or segment thereof, for (i) the shapes of individual teeth, (ii) relations between shapes of neighbouring teeth and (iii) relations between positions and/or orientations of neighbouring teeth, said energy function comprising a first measure indicative of a fit between said patient's anatomy and said adapted virtual teeth setup, and a second measure indicating a probability of said adapted virtual teeth setup given said statistical model; and
   estimating said shape, position and orientation of said dental restoration using the adapted virtual teeth setup resulting from said applied and optimized energy function.

2. The method of claim 1, further comprising postprocessing to take into account the shape of an antagonist crown of a tooth in said adapted virtual teeth setup by defining occlusal contact points and deforming the shape of said tooth of said adapted virtual teeth setup to obtain a desirable occlusal contact at said defined contact points.

3. The method of claim 1, further comprising fitting of a crown from a library to a tooth of said adapted virtual teeth setup.

4. The method of claim 1, further comprising exporting said estimated shape, position and orientation of said dental restoration.

5. The method of claim 1, further comprising:
   receiving user input modifying at least one of a shape, position and orientation of a tooth requiring dental restoration as estimated for said tooth using said adapted teeth setup resulting from said optimized energy function,
   applying and optimizing a second energy function, representing a quality measure for said adapted virtual teeth setup, to adjust said adapted virtual teeth setup to said indicated remaining tooth or teeth in said digitized surface mesh of the intra-oral region of the patient considering the constraint provided by said inputted modification for said tooth requiring restoration and given said statistical model, said second energy function comprising a first measure indicative of a fit between said patient's anatomy and said adjusted and adapted virtual teeth setup given said constraint, and a second measure indicating a probability of said adjusted and adapted virtual teeth setup given said statistical model, and
   re-estimating said at least one element of said shape, position and orientation of said dental restoration using the adjusted and adapted virtual teeth setup resulting from said applied and optimized second energy function.

6. The method according to claim 5 wherein said inputted modification of at least one of a shape, position and orientation for a tooth requiring restoration is a hard constraint in said adjusting.

7. The method according to claim 5 wherein said inputted modification of at least one of a shape, position and orientation for a tooth requiring restoration is a soft constraint in said adjusting.

8. The method according to claim 1, further comprising postprocessing to prevent neighbouring teeth in said adapted virtual teeth setup from overlapping with each other by iteratively detecting maximal overlapping points and modifying said tooth shape to remove said overlap.

9. The method according to claim 1, wherein said first measure comprises a landmark term indicative of a distance between corresponding landmarks on said virtual teeth setup and on said digitized surface mesh of the intra-oral region of the patient.

10. The method according to claim 1, wherein said first measure comprises a surface term indicating, for points of said virtual teeth setup, a distance to said digitized surface mesh of the intra-oral region of the patient.

11. The method according to claim 1, wherein said energy function comprises a contact point term providing a measure for a distance between contact point sets of neighbouring teeth.

12. The method according to claim 1, wherein said energy function comprises a symmetric shape, position and/or orientation term giving a symmetry measure for the shape, position and/or orientation of two contralateral teeth.

13. The method according to claim 1, wherein said energy function takes into account one or more heuristic rules defining a relation between the positions of predefined landmarks on teeth of said adapted virtual teeth setup.

14. The method according to claim 1, wherein said energy function takes into account one or more heuristic rules defining a relation between distances in-between predefined landmarks on teeth of said adapted virtual teeth setup.

15. The method according to claim 1, wherein said statistical model is obtained using a training phase, which comprises:
providing a multitude of virtual teeth setups comprising digital surface meshes of different near-ideal teeth setups and wherein the individual teeth are available as separated surface meshes,
computing a mean virtual teeth setup from said multitude of virtual teeth setups, and
computing from said multitude of virtual teeth setups the statistical model for at least (i) the shapes of individual teeth, (ii) the relations between shapes of neighbouring teeth and (iii) the relations between positions and/or orientations of neighbouring teeth.

16. The method according to claim 15, wherein said virtual teeth setups are obtained by extracting the individual teeth surfaces from a surface mesh of scans of dental casts or impressions or of intra-oral scans obtained from individuals having a near-ideal teeth setup.

17. The method according to claim 1, wherein said second measure of said energy function is composed of three separate terms corresponding to said shape of said individual teeth, said relations between said shapes of said neighbouring teeth and said relations between said positions and/or orientations of said neighbouring teeth, respectively.

18. A computer based method for estimating a shape, position and orientation of one or more teeth from a digitized intra-oral surface of a patient, said method comprising:
indicating the one or more teeth which require said estimation;
providing a virtual teeth setup comprising one or more teeth corresponding to said one or more teeth requiring said estimation, wherein said virtual teeth setup comprises separated surface meshes of individual teeth positioned in a teeth arch or segment thereof;
providing a digitized surface mesh of an intra-oral region of said patient comprising said one or more indicated teeth requiring said estimation;
applying and optimizing an energy function, representing a quality measure for said virtual teeth setup, by adapting the virtual teeth setup to said one or more indicated teeth in said digitized surface mesh of the intra-oral region of said patient given a statistical model, for a given dentition or segment thereof, for (i) the shapes of individual teeth, (ii) relations between shapes of neighbouring teeth and (iii) and/or relations between positions and/or orientations of neighbouring teeth, said energy function comprising a first measure indicative of a fit between said patient's anatomy and said virtual teeth setup, and a second measure indicating a probability of said adapted virtual teeth setup given said statistical model; and
estimating said shape, position and orientation for said at least one tooth using said adapted virtual teeth setup resulting from said applied and optimized energy function.

19. The method according to claim 18 wherein said adapted virtual teeth setup provides a second digitized surface mesh representing the intra-oral region of said patient wherein said one or more teeth are available as separated surface meshes of individual teeth.

20. The method according to claim 18, wherein said method is part of a digital orthodontic planning method.

21. The method according to claim 18 further comprising:
receiving user input virtually modifying one of the shape, position and orientation of an indicated tooth as estimated for said tooth using the adapted teeth setup resulting from said optimized energy function,
applying and optimizing a second energy function, representing a quality measure for said adapted virtual teeth setup, to adjust said adapted virtual teeth setup to said tooth in said digitized surface mesh of the intra-oral region considering the constraint provided by said inputted modification for said tooth and given said statistical model, said second energy function comprising a first measure indicative of a fit between said patient's anatomy and said adjusted and adapted virtual teeth setup given said constraint, and a second measure indicating a probability of said adjusted and adapted virtual teeth setup given said statistical model, and
proposing a virtual modification of at least one element of a shape, position and orientation of one or more teeth in said digitized intra-oral surface of a patient resulting from said applied and optimized second energy function.

22. The method according to claim 21 wherein said inputted virtual modification of at least one of a shape, position and orientation of a tooth in said segmented digitized surface mesh is considered as a hard constraint in said adjusting.

23. The method according to claim 21 wherein said inputted virtual modification of at least one of a shape, position and orientation of a tooth in said segmented digitized surface mesh is considered as a soft constraint in said adjusting.

24. The method according to claim 18, further comprising postprocessing to prevent neighbouring teeth in said adapted virtual teeth setup from overlapping with each other by iteratively detecting maximal overlapping points and modifying said tooth shape to remove said overlap.

25. The method according to claim 18, wherein said first measure comprises a landmark term indicative of a distance between corresponding landmarks on said virtual teeth setup and on said digitized surface mesh of the intra-oral region of the patient.

26. The method according to claim 18, wherein said first measure comprises a surface term indicating, for points of said virtual teeth setup, a distance to said digitized surface mesh of the intra-oral region of the patient.

27. The method according to claim 18, wherein said energy function comprises a contact point term providing a measure for a distance between contact point sets of neighbouring teeth.

28. The method according to claim 18, wherein said energy function comprises a symmetric shape, position and/or orientation term giving a symmetry measure for the shape, position and/or orientation of two contralateral teeth.

29. The method according to claim 18, wherein said energy function takes into account one or more heuristic rules defining a relation between the positions of predefined landmarks on teeth of said adapted virtual teeth setup.

30. The method according to claim 18, wherein said energy function takes into account one or more heuristic rules defining a relation between distances in-between predefined landmarks on teeth of said adapted virtual teeth setup.

31. The method according to claim 18, wherein said statistical model is obtained using a training phase, which comprises:
provides a multitude of virtual teeth setups comprising digital surface meshes of different near-ideal teeth setups and wherein the individual teeth are available as separated surface meshes,
computing a mean virtual teeth setup from said multitude of virtual teeth setups, and
computing from said multitude of virtual teeth setups the statistical model for at least (i) the shapes of individual teeth, (ii) the relations between shapes of neighbouring teeth and (iii) the relations between positions and/or orientations of neighbouring teeth.

32. The method according to claim 31, wherein said virtual teeth setups are obtained by extracting the individual teeth surfaces from a surface mesh of scans of dental casts or impressions or of intra-oral scans obtained from individuals having a near-ideal teeth setup.

33. The method according to claim 18, wherein said second measure of said energy function is composed of three separate terms corresponding to said shape of said individual teeth, said relations between said shapes of said neighbouring teeth and said relations between said positions and/or orientations of said neighbouring teeth, respectively.

34. The method according to claim 18, wherein applying said energy function comprises an optimization over at least one element of a shape, position and orientation of said one or more remaining teeth of said first measure and said second measure.

35. The method according to claim 18, wherein applying said energy function comprises an optimization over said shape, position and orientation of said dental restoration of said second measure.

* * * * *

UNITED STATES PATENT AND TRADEMARK OFFICE
CERTIFICATE OF CORRECTION

PATENT NO. : 11,443,494 B2
APPLICATION NO. : 16/223604
DATED : September 13, 2022
INVENTOR(S) : Johannes Keustermans Page 1 of 2

It is certified that error appears in the above-identified patent and that said Letters Patent is hereby corrected as shown below:

In the Specification

Column 21, Line 46, delete "e∈εV×V" and insert -- e∈ε⊆V×V --.

Column 24, Line 55-56, delete "Θ=G_Θ,{θ_T},{θ_TT})" and insert -- Θ=(G_Θ,{θ_T},{θ_TT}) --.

Column 24, Line 57-58, delete "Φ=G_Φ,{Φ_TT})" and insert -- Φ=(G_Φ,{Φ_TT}) --.

Column 25, Line 22-26 (approx.), delete " $\propto \prod_{T \in S} \exp\left(-\frac{(x_T - \bar{x}_T)\sum_T^{-1}(x_T - \bar{x}_T)}{2}\right)$ " and insert -- $\propto \prod_{T \in S} \exp\left(-\frac{(x_T - \bar{x}_T)\Sigma_T^{-1}(x_T - \bar{x}_T)}{2}\right)$ --.

Column 25, Line 32, delete "enemy" and insert -- energy --.

Column 25, Line 36-38 (approx.), delete " $E_{MP}(S|\{\theta_T\}) = \sum_{T \in S} \frac{1}{2}(x_T - \bar{x}_T)\sum_T^{-1}(x_T - \bar{x}_T)$ " and insert -- $E_{MP}(S|\{\theta_T\}) = \sum_{T \in S} \frac{1}{2}(x_T - \bar{x}_T)\Sigma_T^{-1}(x_T - \bar{x}_T)$ --.

Column 25, Line 66-67 (approx.), delete "p_θPR(x_R|x_P)=N(x̄_R+Q_R M^−1 Q_P^T(x_P−x̄_P),σ²(Q_R M^−1 Q_R^T))" and insert -- $p_{\theta_{PR}}(x_R|x_P) = N(\bar{x}_R + Q_R M^{-1} Q_P^T(x_P - \bar{x}_P), \sigma^2 Q_R M^{-1} Q_R^T)$ --.

Signed and Sealed this
Fourth Day of April, 2023

*Katherine Kelly Vidal*
Katherine Kelly Vidal
*Director of the United States Patent and Trademark Office*

CERTIFICATE OF CORRECTION (continued)
U.S. Pat. No. 11,443,494 B2

Column 27, Line 42 (approx.), delete "$\int_{R^3} p_P(x)dx$," and insert -- $\int_{R^3} p_P^2(x)dx$ --.

Column 29, Line 65, delete "$R_R^* = HR_L H'^T$" and insert -- $R_R^* = HR_L H'$ --.

Column 30, Line 8 (approx.), delete "$t_L = t_L$," and insert -- $t_L = t_L^*$, --.

Column 30, Line 13 (approx.), delete "$t_R = t_R$." and insert -- $t_R = t_R^*$. --.

Column 30, Line 54, delete "$v^L{}_i \in V_R$" and insert -- $v^R{}_i \in V_R$ --.

Column 38, Line 29 (approx.), delete "$C_{DM} = \{v_i | d(T_D, R_M v_i + t_M) < T, v_i \in V_M\}$" and insert -- $C_{DM} = \{v_i \mid d(T_M, R_D v_i + t_D) < \tau, v_i \in V_D\}$, --.

Column 40, Line 55 (approx.), delete "$\varphi(\alpha) = E(S_k \alpha p_k)\ \alpha > 0$" and insert -- $\varphi(\alpha) = E(S_k + \alpha p_k)\ \alpha > 0$ --.

Column 41, Line 6 (approx.), delete "$\alpha(\alpha)$" and insert -- $\varphi(\alpha)$ --.

Column 43, Line 12-13 (approx.), delete "$\dfrac{|\Delta E(S_k)^T \nabla E(S_{k-1})|}{\|\nabla E(S_k)\|^2} \geq \nu$" and insert -- $\dfrac{|\nabla E(S_k)^T \nabla E(S_{k-1})|}{\|\nabla E(S_k)\|^2} \geq \nu$ --.

Column 43, Line 49 (approx.), delete "$s_k^T y_k$" and insert -- $s_k^T y_k > 0$ --.

Column 47, Line 21, delete "0T" and insert -- θT --.

Column 48, Line 12, delete "r" and insert -- $\tau$ --.

Column 49, Line 37, after "fixed points" insert -- $\{f_i\}$, --.

In the Claims

Column 53, Line 50, Claim 18, after "(iii)" delete "and/or".